US012242215B2

(12) United States Patent
Kitago

(10) Patent No.: US 12,242,215 B2
(45) Date of Patent: Mar. 4, 2025

(54) IMAGE FORMING APPARATUS

(71) Applicant: CANON KABUSHIKI KAISHA, Tokyo (JP)

(72) Inventor: Shinya Kitago, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 18/109,497

(22) Filed: Feb. 14, 2023

(65) Prior Publication Data

US 2023/0259053 A1 Aug. 17, 2023

(30) Foreign Application Priority Data

Feb. 15, 2022 (JP) ................................ 2022-021680

(51) Int. Cl.
*G03G 15/16* (2006.01)

(52) U.S. Cl.
CPC ....... *G03G 15/1615* (2013.01); *G03G 15/161* (2013.01); *G03G 2215/1623* (2013.01)

(58) Field of Classification Search
CPC ............. G03G 15/1615; G03G 15/161; G03G 2215/1623
See application file for complete search history.

(56) References Cited

U.S. PATENT DOCUMENTS 9,037,014 B2 * 5/2015 Yoshioka ........... G03G 15/1695 399/45
9,188,910 B2 * 11/2015 Yoshioka ........... G03G 15/1615
2011/0064465 A1 * 3/2011 Kaseda .............. G03G 15/6561 399/121
2011/0188891 A1 * 8/2011 Ryu .................. G03G 15/1615 399/121
2017/0168427 A1 * 6/2017 Sasaki ................ G03G 15/1615
2021/0397112 A1 * 12/2021 Tsuruga ............... G03G 15/502
2021/0397113 A1 * 12/2021 Kakehi .............. G03G 15/1615
2022/0026833 A1 * 1/2022 Sakaguchi ......... G03G 15/6558
2023/0314981 A1 * 10/2023 Hamano ............ G03G 15/1615 399/66
2023/0341794 A1 * 10/2023 Taniguchi .......... G03G 15/6558

FOREIGN PATENT DOCUMENTS

JP 9-80926 A 3/1997
JP 2021-135374 A 9/2021
JP 2022-000691 A 1/2022

* cited by examiner

*Primary Examiner* — Sevan A Aydin
(74) *Attorney, Agent, or Firm* — Venable LLP

(57) ABSTRACT

An image forming apparatus includes an intermediary transfer belt, stretching rollers, a pressing member, a supporting member, a moving mechanism, and a controller. In a case that an operation in a toner image transfer mode is executed for recording materials of a predetermined kind in a predetermined environmental condition, when a sum of times each in which the operation was executed from a new state of the pressing member is a first time, a position of the supporting member during execution of the operation in the mode is a first position, and when the sum is a second time longer than the first time, the position of the supporting member during the execution of the operation is a second position where the pressing member is moved in a direction in which the pressing member presses the belt more than in the first position.

13 Claims, 11 Drawing Sheets

IMAGE FORMING APPARATUS

FIELD OF THE INVENTION AND RELATED ART

The present invention relates to an image forming apparatus, such as a printer, a printing machine, a copying machine, a facsimile machine, or a multi-function machine having a plurality of functions of the foregoing machines, of an electrophotographic type or an electrostatic recording type.

Conventionally, as the image forming apparatus of the electrophotographic type, there is an image forming apparatus using a rotatable endless belt as an image bearing member for bearing and conveying a toner image. As such a belt, for example, there is an intermediary transfer belt used as a second image bearing member for feeding a sheet-like recording material such as paper from a photosensitive member or the like as a first image bearing member. In the following, principally, an image forming apparatus employing an intermediary transfer type system including an intermediary transfer belt will be described as an example.

In the image forming apparatus using the intermediary transfer belt, a toner image formed on the photosensitive member or the like is primary-transferred onto the intermediary transfer belt at a primary transfer portion. Then, the toner image primary-transferred on the intermediary transfer belt is secondary-transferred onto the recording material at a secondary transfer portion. By an inner member (inner secondary transfer member) provided on an inner peripheral surface side and an outer member (outer secondary transfer member) provided on an outer peripheral surface side, the secondary transfer portion which is a contact portion between the intermediary transfer belt and the outer member is formed. As the inner member, an inner secondary transfer roller which is one of a plurality of stretching rollers for stretching the intermediary transfer belt is used. As the outer member, an outer secondary transfer roller which is provided in a position opposing the inner secondary transfer roller while nipping the intermediary transfer belt between itself and the secondary transfer inner roller and which is pressed toward the inner secondary transfer roller is used in many instances. Further, a voltage of a polarity opposite to a charge polarity of toner is applied to the outer secondary transfer roller (or a voltage of the same polarity as the charge polarity of the toner is applied to the inner secondary transfer roller), so that the toner image is secondary-transferred from the intermediary transfer belt onto the recording material in the secondary transfer portion. Incidentally, as regards the recording material, a "leading end" and a "trailing end" refer to the leading end and the trailing end, respectively, with respect to a recording material feeding direction. Further, upstream of the secondary transfer portion with respect to a rotational direction of the intermediary transfer belt is also simply referred to as "upstream of the secondary transfer portion" or the like.

In order to accurately transfer the toner image, formed on the intermediary transfer belt, onto the recording material, a contact length between the intermediary transfer belt and the recording material with respect to the rotational direction of the intermediary transfer belt becomes important. In the case where the contact length is long, there is a possibility that an image defect or the like due to friction between the toner and the recording material caused by a speed difference between the intermediary transfer belt and the recording material occurs. On the other hand, in the case where the contact length is short, there is a possibility that an image defect or the like due to electric discharge generating in a gap between the recording material and the intermediary transfer belt occurs. For that reason, in view of a contact position or the like of a leading end of the recording material to the intermediary transfer belt on a side upstream of the secondary transfer portion, a feeding (conveying) attitude of the recording material and a stretching layout of the intermediary transfer belt are determined.

In Japanese Laid-Open Patent Application (JP-A) Hei 9-80926, a constitution in which a planar rectifying member for pressing the intermediary transfer belt in contact with an inner peripheral surface of the intermediary transfer belt is provided upstream of the contact position (tucking position) of a leading end of the recording material to the intermediary transfer belt with respect to the rotational direction of the intermediary transfer belt is proposed. In JP-A Hei 9-80926, as the planar rectifying member, a flexible baffle plate or an elastic roll is used.

As described above, a pressing member (back-up member) is contacted to the inner peripheral surface of the intermediary transfer belt on a side upstream of the secondary transfer portion, so that a shape (attitude) of the intermediary transfer belt on the side upstream of the secondary transfer portion can be made a desired shape (attitude). In such a constitution, as a material of the pressing member, a flexible resin material is used, for example. Further, in order to make the contact length between the intermediary transfer belt and the recording material appropriate, on the side upstream of the secondary transfer portion, the inner peripheral surface of the intermediary transfer belt is pressed by the pressing member, so that the intermediary transfer belt is deformed and thus an appropriate shape (attitude) of the intermediary transfer belt is formed.

However, in the above-described constitution, a state in which the inner peripheral surface of the intermediary transfer belt and the pressing member contact and rub with each other is continued, and therefore, to the pressing member, a load due to reaction force to a pressing force of the pressing member is applied, so that a change with time of creep deformation, abrasion (wearing), and the like occurs in some instances. When the change with time of the creep deformation, the abrasion, and the like occurs, a contact position of the pressing member to the intermediary transfer belt changes and a force by which the pressing member presses the inner peripheral surface of the intermediary transfer belt lowers, so that a deformation amount of the intermediary transfer belt by the pressing member on the side upstream of the secondary transfer portion becomes small. By this, a contact length between the intermediary transfer belt and the recording material on the side upstream of the secondary transfer portion becomes short, so that a gap between the intermediary transfer belt and the recording material becomes large and thus there is a possibility that the image defect due to the electric discharge occurs.

Incidentally, in the above, a problem of the conventional constitution was described by taking, as an example, the secondary transfer portion which is a transfer portion of the toner image from the intermediary transfer belt onto the recording material, but there can arise a similar problem also for a transfer portion of the toner image from another belt-shaped image bearing member such as a photosensitive member.

SUMMARY OF THE INVENTION

A principal object of the present invention is to provide an image forming apparatus capable of suppressing an occurrence of an image defect by maintaining a shape of a belt at an appropriate shape even in the case where a (pressing member) caused a change with time of deformation, abrasion, and the like.

The object has been accomplished by the image forming apparatus according to the present invention.

According to an aspect of the present invention, there is provided an image forming apparatus comprising: an intermediary transfer belt onto which a toner image is transferred; a plurality of stretching rollers configured to stretch the belt, wherein the stretching rollers include an inner roller forming a transfer portion where the toner image is transferred from the belt onto a recording material and include an upstream roller provided upstream of and adjacent to the inner roller with respect to a rotational direction of the belt; a pressing member contactable to an inner peripheral surface of the belt in a position upstream of the inner roller and downstream of the upstream roller with respect to the rotational direction of the belt and capable of pressing the belt from an inner peripheral surface side toward an outer peripheral surface side by elastically urging the belt; a supporting member provided movably and configured to support the pressing member; a moving mechanism configured to move the supporting member; and a controller capable of executing an operation in a mode in which the toner image is transferred from the belt onto the recording material in a state in which the pressing member presses the belt, and configured to control the moving mechanism, wherein in a case that in the operation in the mode is executed for recording materials of a predetermined kind in a predetermined environmental condition, when a sum of times each in which the operation in the mode was executed from a new state of the pressing member is a first time, a position of the supporting member during execution of the operation in the mode is a first position, and when the sum is a second time longer than the first time, the position of the supporting member during the execution of the operation in the mode is a second position where the pressing member is moved in a direction in which the pressing member presses the belt more than in the first position.

According to another aspect of the present invention, there is provided an image forming apparatus comprising: an intermediary transfer belt onto which a toner image is transferred; a plurality of stretching rollers configured to stretch the belt, wherein the stretching rollers include an inner roller forming a transfer portion where the toner image is transferred from the belt onto a recording material and include an upstream roller provided upstream of and adjacent to the inner roller with respect to a rotational direction of the belt; a pressing member contactable to an inner peripheral surface of the belt in a position upstream of the inner roller and downstream of the upstream roller with respect to the rotational direction of the belt and capable of pressing the belt from an inner peripheral surface side toward an outer peripheral surface side by elastically urging the belt; a supporting member provided movably and configured to support the pressing member; a moving mechanism configured to move the supporting member; and a controller capable of executing an operation in a mode in which the toner image is transferred from the belt onto the recording material in a state in which the pressing member presses the belt, and configured to control the moving mechanism, wherein in a case that in the operation in the mode is executed for recording materials of a predetermined kind in a predetermined environmental condition, when a sum of numbers of sheets each outputted in the operation in the mode was executed from a new state of the pressing member is a first number of sheets, a position of the supporting member during execution of the operation in the mode is a first position, and when the sum is a second number of sheets more than the first number of sheets, the position of the supporting member during the execution of the operation in the mode is a second position where the pressing member is moved in a direction in which the pressing member presses the belt more than in the first position.

According to a further aspect of the present invention, there is provided an image forming apparatus comprising: an intermediary transfer belt onto which a toner image is transferred; a plurality of stretching rollers configured to stretch the belt, wherein the stretching rollers include an inner roller forming a transfer portion where the toner image is transferred from the belt onto a recording material and include an upstream roller provided upstream of and adjacent to the inner roller with respect to a rotational direction of the belt; a pressing member contactable to an inner peripheral surface of the belt in a position upstream of the inner roller and downstream of the upstream roller with respect to the rotational direction of the belt and capable of pressing the belt from an inner peripheral surface side toward an outer peripheral surface side by elastically urging the belt; a supporting member provided movably and configured to support the pressing member; a moving mechanism configured to move the supporting member; and a controller capable of executing an operation in a mode in which the toner image is transferred from the belt onto the recording material in a state in which the pressing member presses the belt, and configured to control a position of the supporting member during execution of the operation in the mode, wherein the controller controls the position of the supporting member during the execution of the operation in the mode on the basis of information correlating with a time in which the pressing member presses the belt.

Further features of the present invention will become apparent from the following description of exemplary embodiments with reference to the attached drawings.

Figure 2:
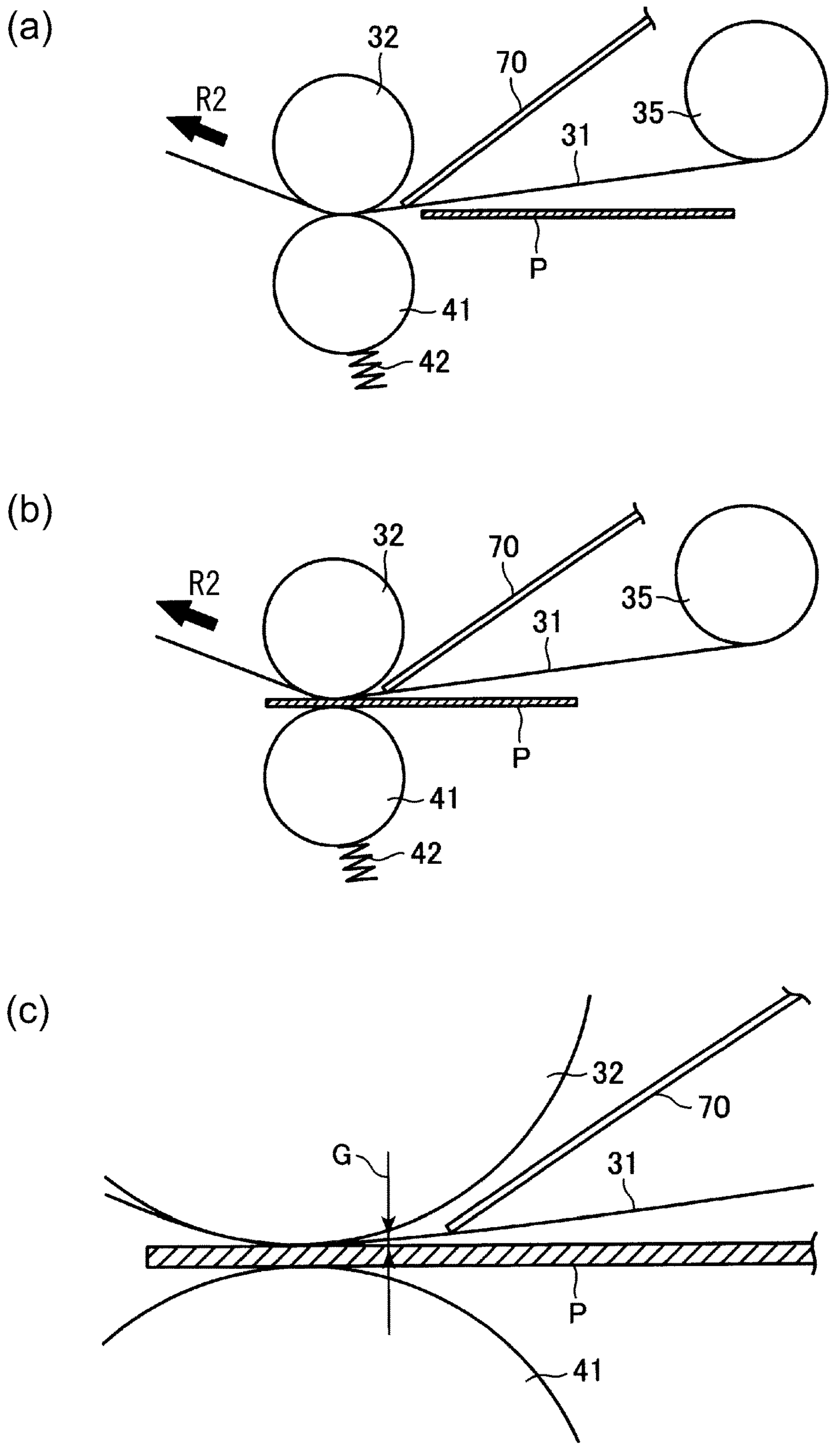

Parts (a), (b) and (c) of FIG. 2 are schematic sectional views each showing a secondary transfer portion and a neighborhood thereof.

Figure 3:
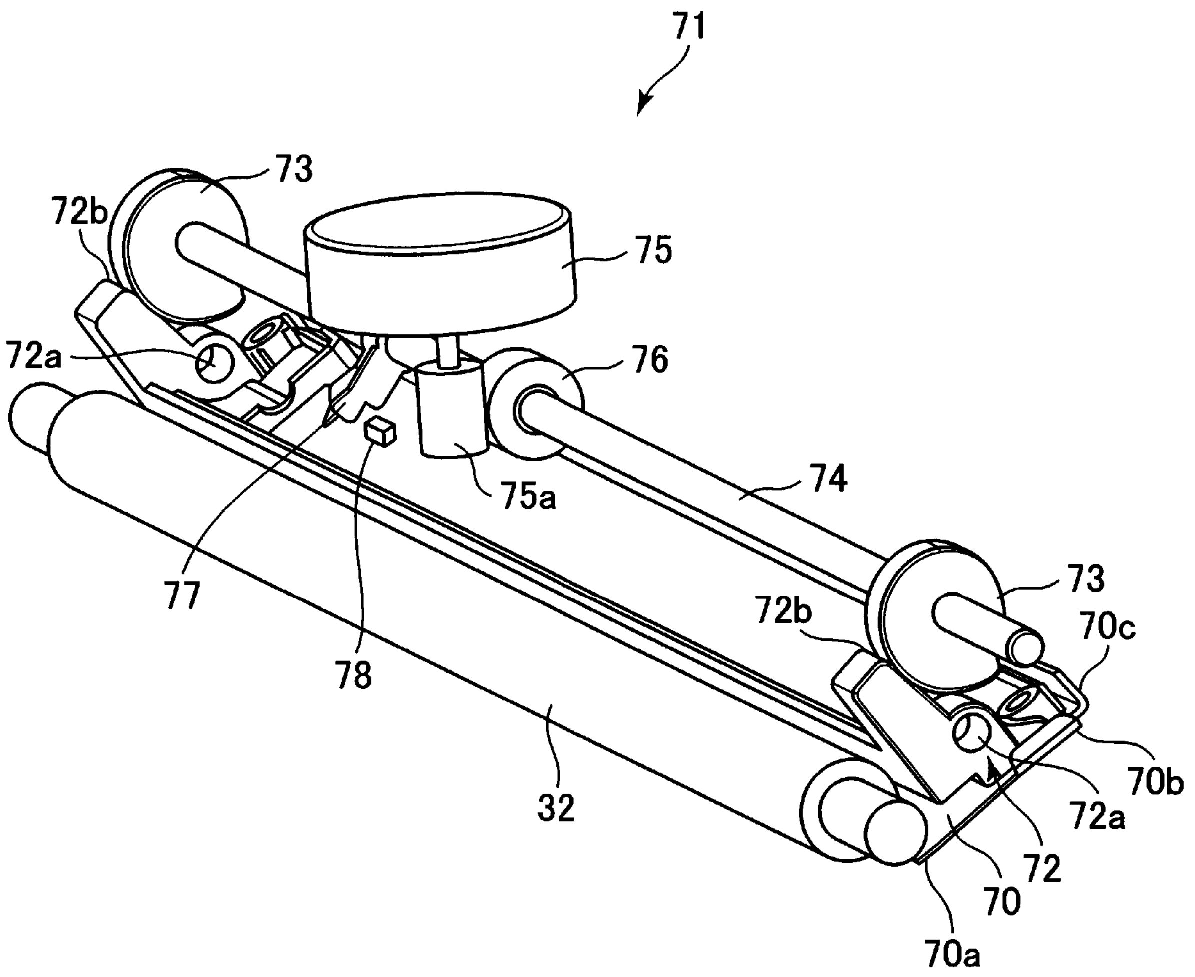

FIG. 3 is a schematic perspective view of a moving mechanism.

Figure 4:
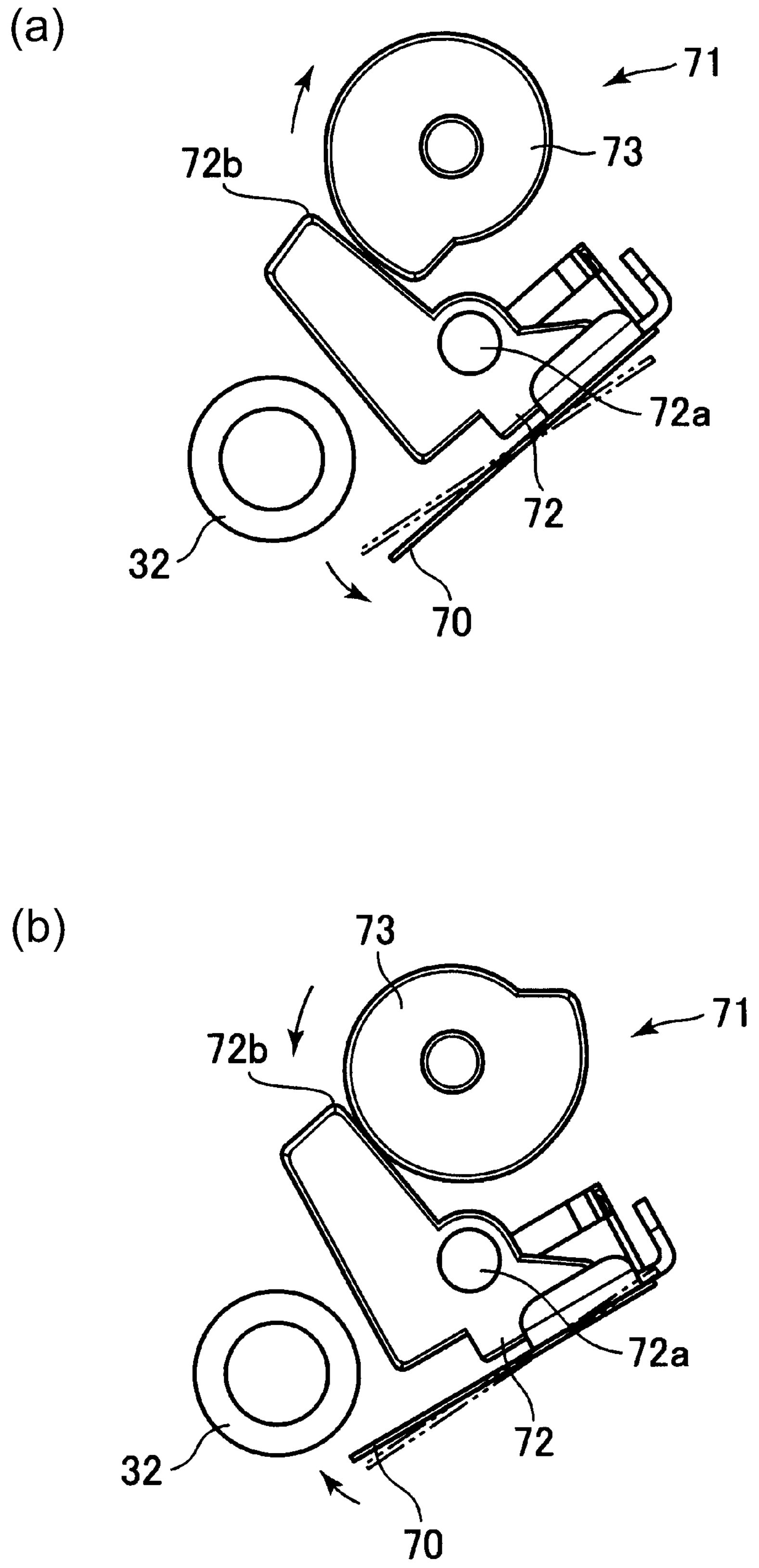

Parts (a) and (b) of FIG. 4 are schematic side views for illustrating an operation of the moving mechanism.

Figure 5:
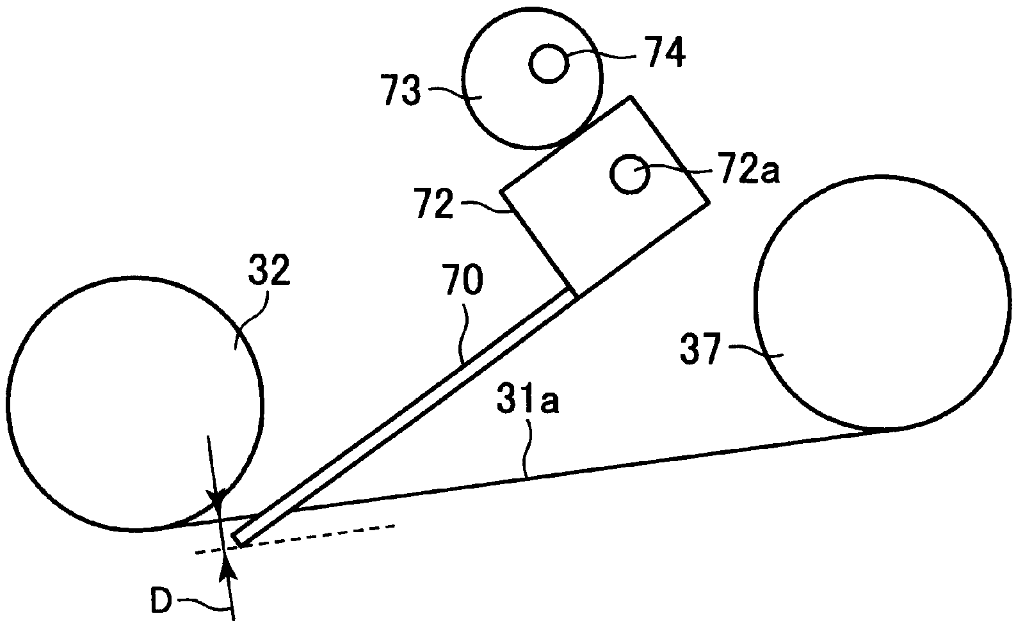

FIG. 5 is a schematic sectional view for illustrating a penetration amount of a pressing member.

Figure 6:
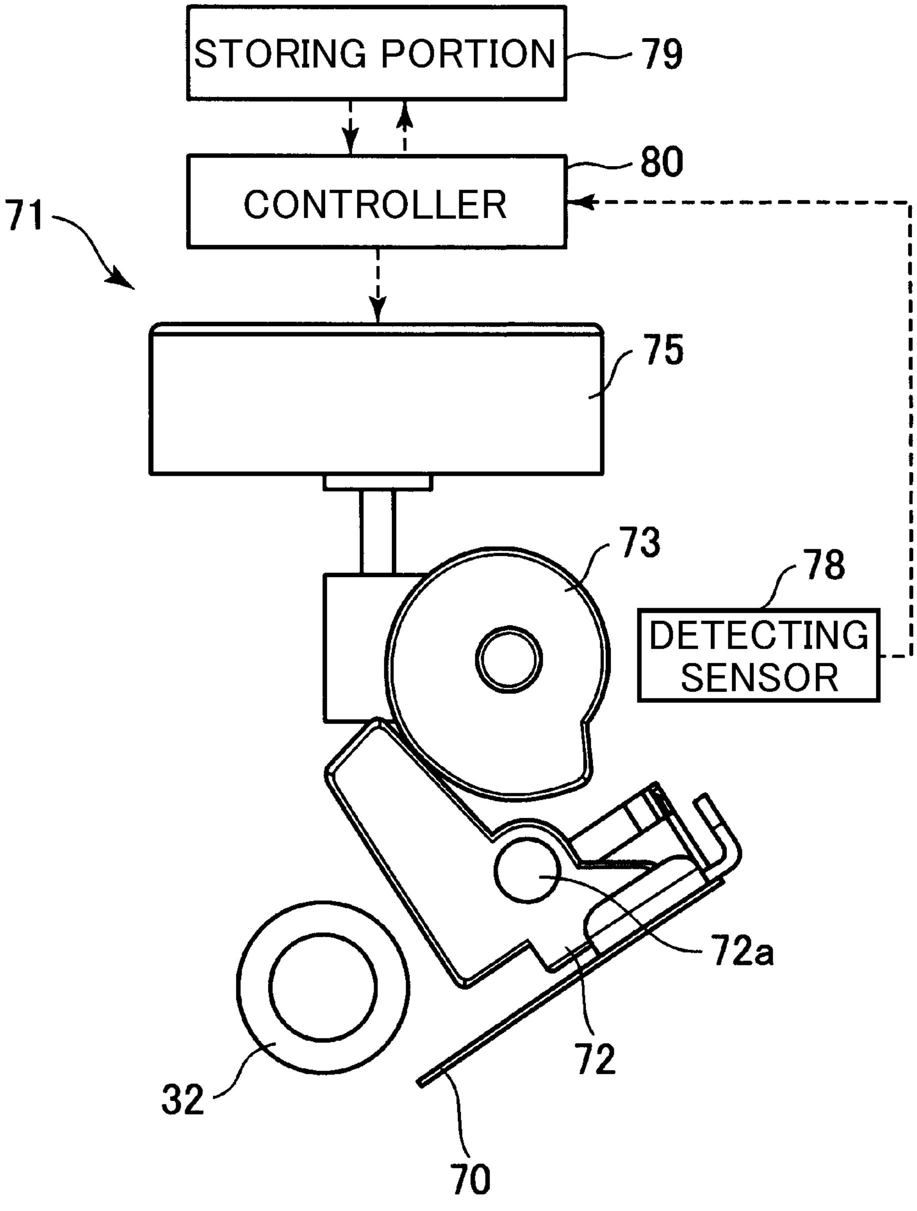

FIG. 6 is a schematic block diagram showing a control mode of the moving mechanism.

Figure 7:
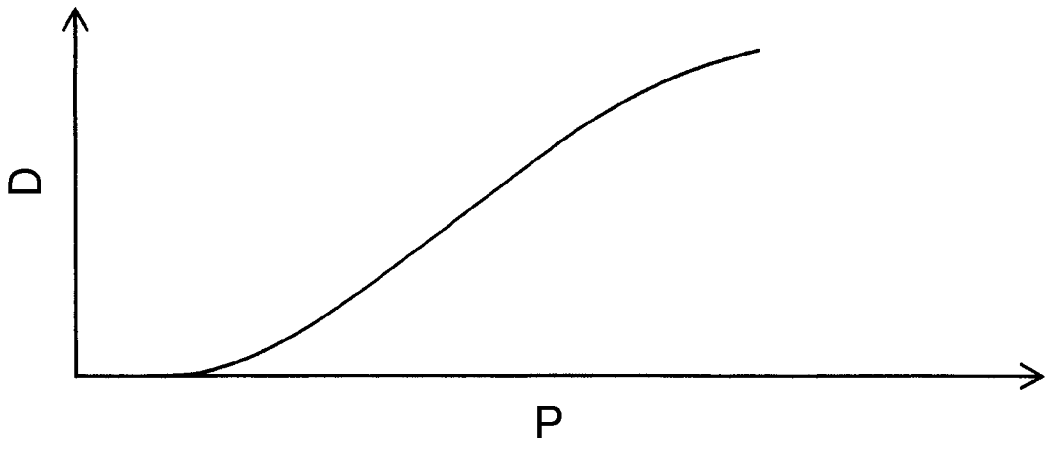

FIG. 7 is a graph showing an outline of a relationship between the penetration amount and an inputted pulse number.

Figure 8:
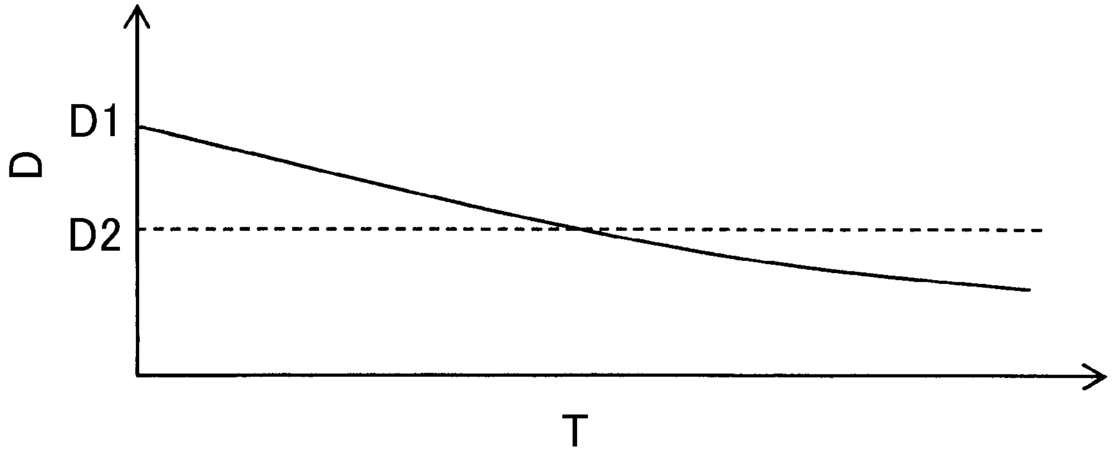

FIG. 8 is a graph showing an outline of a relationship between a contact time and the penetration amount.

Figure 9:
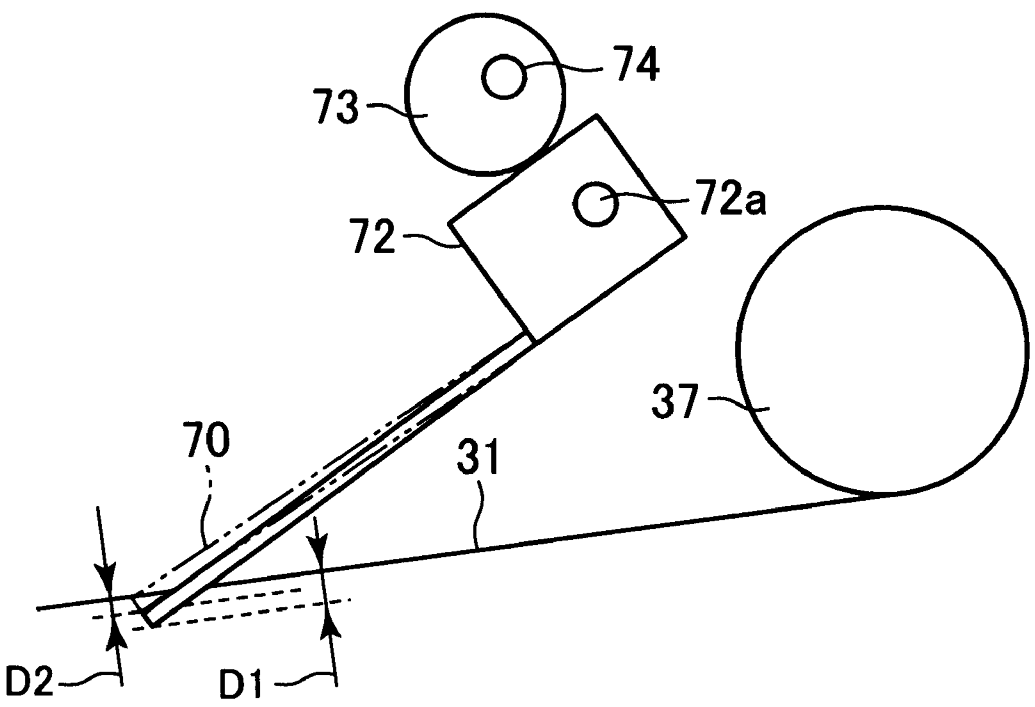

FIG. 9 is a schematic sectional view for illustrating a change in penetration amount.

Figure 10:
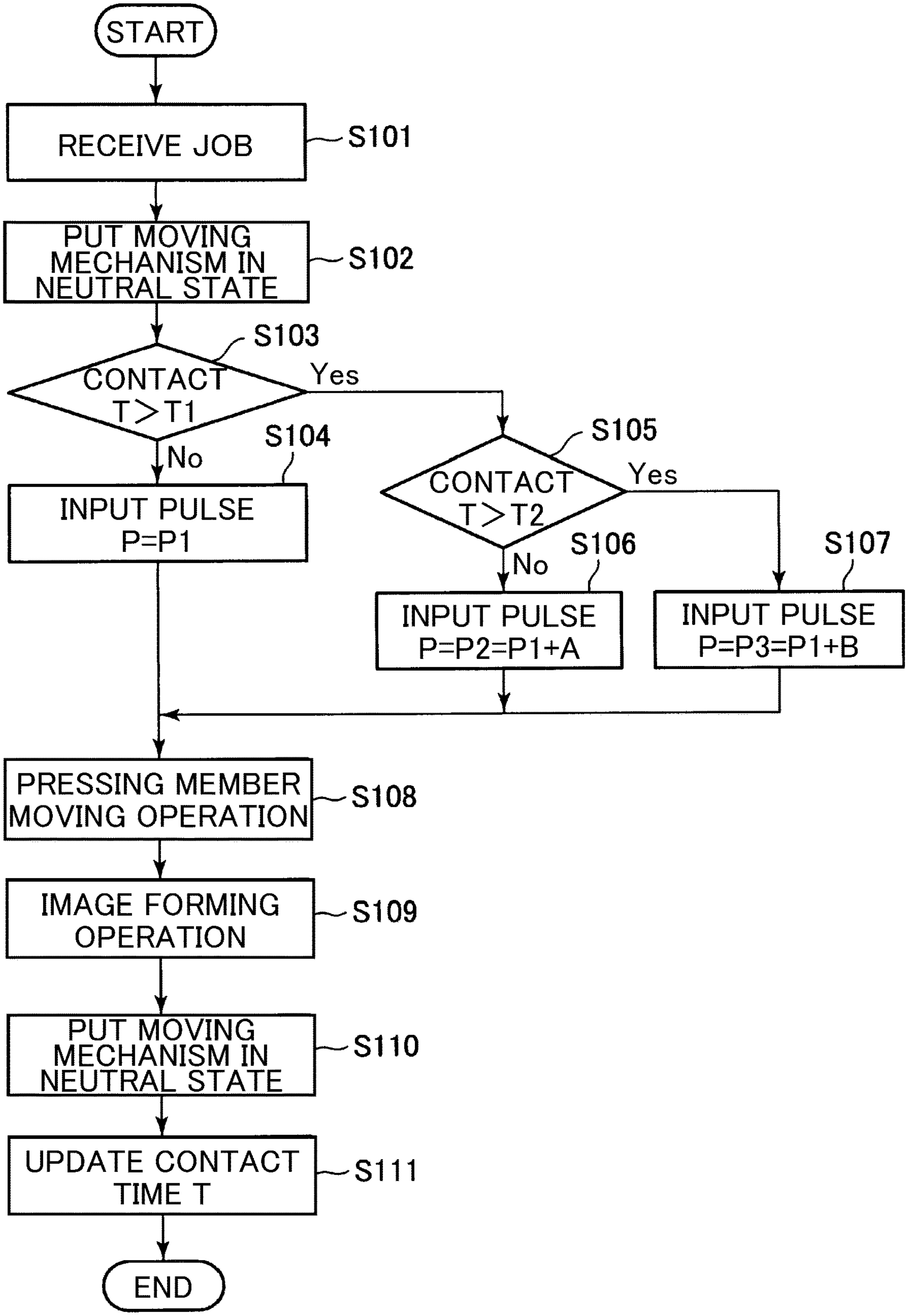

FIG. 10 is a flowchart of an example of an operation of a job.

Figure 11:
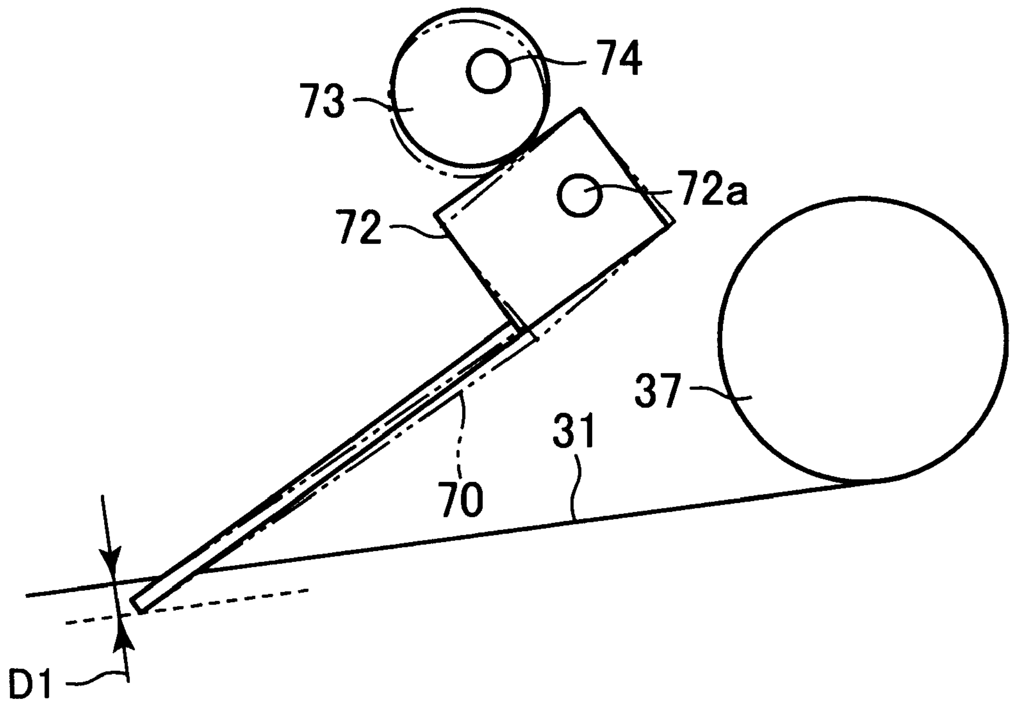

FIG. 11 is a schematic sectional view for illustrating a state in which a position of the pressing member is changed.

Figure 12:
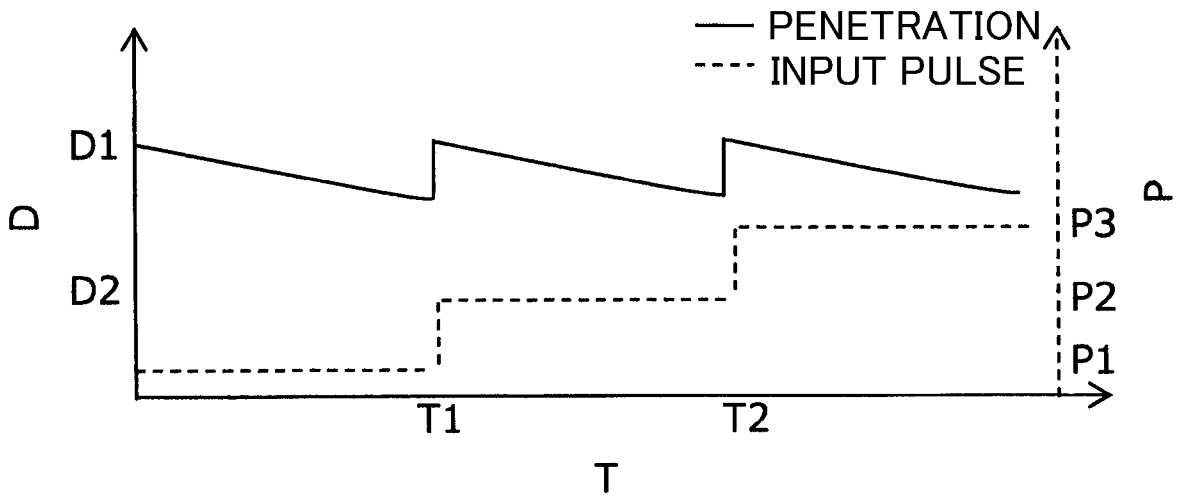

FIG. 12 is a graph showing an outline of a relationship between the contact time, the penetration amount, and the inputted pulse number.

DESCRIPTION OF THE EMBODIMENTS

In the following, an image forming apparatus according to the present invention will be specifically described with reference to the drawings.

Embodiment 1

1. General Constitution and Operation of Image Forming Apparatus

Figure 1:
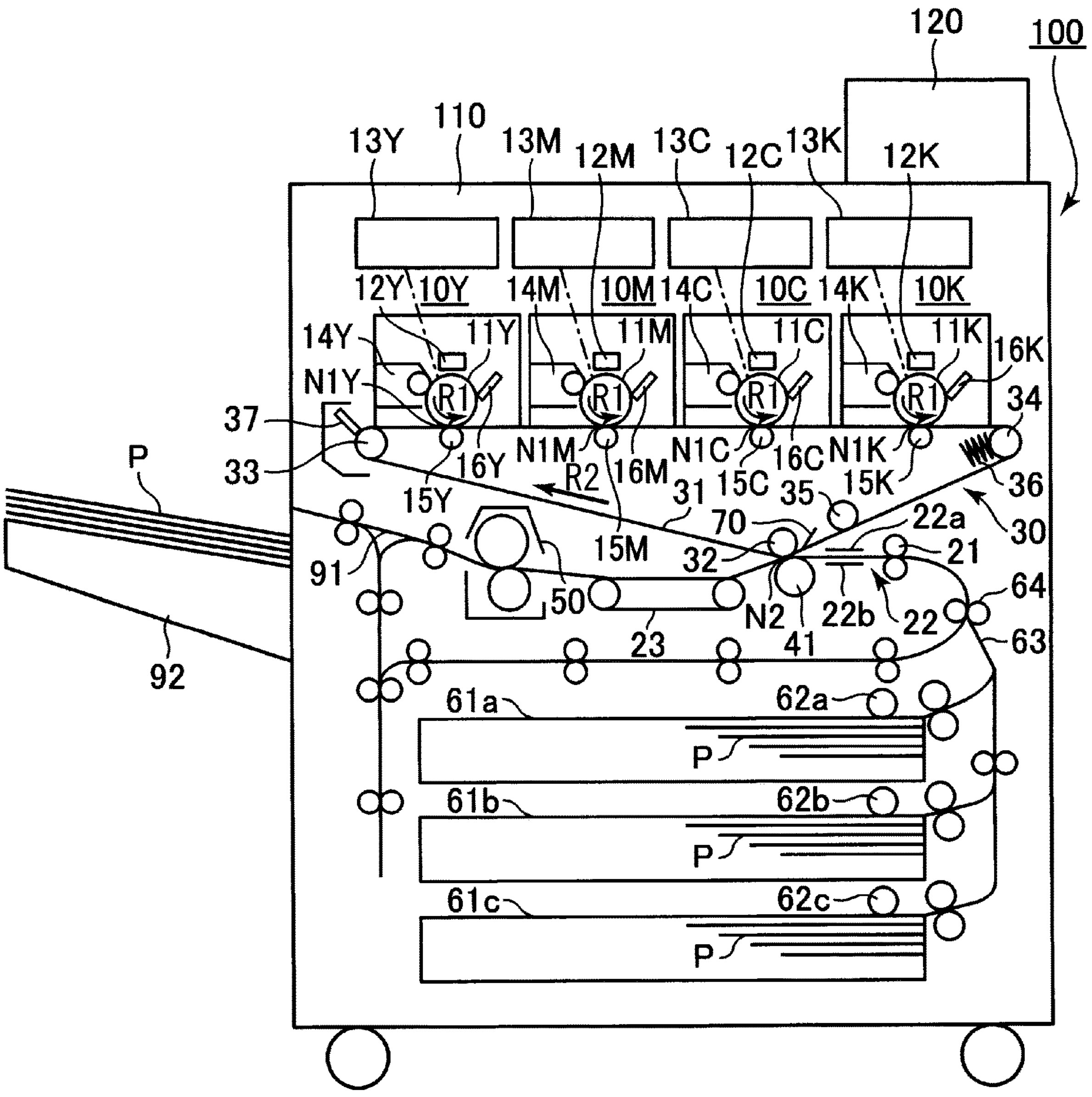
FIG. 1 is a schematic sectional view of an image forming apparatus.

FIG. 1 is a schematic sectional view of an image forming apparatus 100 of this embodiment. The image forming apparatus 100 of this embodiment is a tandem printer employing an intermediary transfer type system. For example, in accordance with an image signal sent from an external device such as a personal computer, the image forming apparatus 100 is capable of forming a full-color image on a sheet-like recording material (a transfer material, a sheet, a recording medium, media) P such as paper by using an electrophotographic type method.

The image forming apparatus 100 includes, as a plurality of image forming portions (stations), four image forming portions SY, SM, SC and SK for forming images of yellow (Y), magenta (M), cyan (C) and black (K). These image forming portions 10Y, 10M, 10C and 10K are disposed in line along a movement direction of an image transfer surface disposed substantially parallel to an intermediary transfer belt 31 (described later). As regards elements of the image forming portions 10Y, 10M, 10C and 10K having the same or corresponding functions or constitutions, suffixes Y, M, C and K for representing the elements for associated colors are omitted, and the elements will be collectively described in some instances. In this embodiment, the image forming portion 10 is constituted by including a photosensitive drum 11 (11Y, 11M, 11C, 11K), a charging device 12 (12Y, 12M, 12C, 12K), an exposure device 13 (13Y, 13M, 13C, 13K), a developing device 14 (14Y, 14M, 14C, 14K), a primary transfer roller 15 (15Y, 15M, 15C, 15K), a cleaning device 16 (16Y, 16M, 16C, 16K) and the like, which are described later.

The image forming apparatus 100 includes the photosensitive drum 11, which is a rotatable drum-shaped (cylindrical) photosensitive member (electrophotographic photosensitive member), as a first image bearing member for bearing a toner image. To the photosensitive drum 11, a driving force is transmitted from a driving motor (not shown) as a driving source, so that the photosensitive drum 11 is rotationally driven at a predetermined peripheral speed (process speed) in an arrow R1 direction (counterclockwise direction) of FIG. 1. A surface of the rotating photosensitive drum 11 is electrically charged uniformly to a predetermined polarity (negative in this embodiment) and a predetermined potential by the charging device 12 as a charging means. During the charging, to the charging device 12, a predetermined charging voltage (charging bias) is applied by a charging power source (not shown). The charged surface of the photosensitive drum 1 is subjected to scanning exposure to light depending on an image signal by the exposure device 13 as an exposure means, so that an electrostatic image (electrostatic latent image) is formed on the photosensitive drum 11. In this embodiment, the exposure device 13 is constituted by a laser scanner device for irradiating the surface of the photosensitive drum 11 with laser light modulated depending on the image signal (image information). The electrostatic latent image formed on the photosensitive drum 11 is developed (visualized) by supplying toner as a developer by the developing device 14 as a developing means, so that a toner image (developer image) is formed on the photosensitive drum 11. In this embodiment, the toner charged to the same polarity (negative polarity in this embodiment) as a charge polarity of the photosensitive drum 11 is deposited on an exposed portion (image portion) of the photosensitive drum 11 where an absolute value of the potential is lowered by exposing to light the surface of the photosensitive drum 11 after the photosensitive drum 11 is uniformly charged (reverse development type). During the development, to a developing roller as a developer carrying member included in the developing device 14, a predetermined developing voltage (developing bias) is applied by a developing power source (not shown). In this embodiment, a normal charge polarity of the toner which is a principal charge polarity of the toner during development is a negative polarity.

As a second image bearing member for bearing the toner image, the intermediary transfer belt 31 which is a rotatable intermediary transfer member constituted by an endless belt is provided so as to oppose the four photosensitive drums 11Y, 11M, 11C and 11K. The intermediary transfer belt 31 is extended around and stretched under predetermined tension by a plurality of stretching (supporting) rollers including a driving roller 33, a tension roller 34, a pre-secondary transfer roller 35, and an inner secondary transfer roller 32. The driving roller 33 transmits a driving force to the intermediary transfer belt 31. The driving roller 33 is rotationally driven by transmission of the driving force thereto from a belt driving motor (not shown) as a driving source. By this, the driving force is inputted from the driving roller 33 to the intermediary transfer belt 6, so that the intermediary transfer belt 6 is rotated (circulated and moved) in an arrow R2 direction (clockwise direction) in FIG. 1 at a peripheral speed (process speed corresponding to the peripheral speed thereof the photosensitive drum 11. The tension roller 34 imparts a predetermined tension to the intermediary transfer belt 31 and controls the tension of the intermediary transfer belt 31 to a certain level. The tension roller 34 is urged from an inner peripheral surface side toward an outer peripheral surface side of the intermediary transfer belt 31 by a tension spring 36 constituted by a compression coil spring which is an urging member as a tension imparting means (urging means) at each of opposite end portions thereof with respect to a rotational axis direction. The pre-secondary transfer roller 35 forms a surface of the intermediary transfer belt 31 in the neighborhood of a portion upstream of a secondary transfer portion N2 (described later) with respect to a rotational direction (surface movement direction) of the intermediary transfer belt 31. In this embodiment, the inner secondary transfer roller (inner member) 32 functions as a secondary transfer member as a secondary transfer means.

Further, on the inner peripheral surface side of the intermediary transfer belt 31, the primary transfer rollers 15Y, 15M, 15C and 15K which are roller-like primary transfer members as primary transfer means are disposed correspondingly to the respective photosensitive drums 11Y, 11M, 11C and 11K. In this embodiment, each of the primary transfer rollers 15 is disposed in a position opposing the photosensitive drum 11 through the intermediary transfer belt 31. Each of the primary transfer rollers 15 presses the intermediary transfer belt 31 toward the associated photosensitive drum 11, so that a primary transfer portion (primary transfer nip) N1 which is a contact portion between the photosensitive drum 11 and the intermediary transfer belt 31 is formed. Of the plurality of stretching rollers, the stretching rollers other than the driving roller 33 and the primary transfer rollers 15 are driven with rotation of the intermediary transfer belt 31. Further, on an inner peripheral surface side of the intermediary transfer belt 31, a pressing member 70 is provided upstream of the inner secondary transfer roller 32 and downstream of the pre-secondary transfer roller with respect to the rotational direction of the intermediary transfer belt 31. The pressing member 70 and a moving mechanism 71 (FIG. 3) for changing a position of this pressing member 70 will be specifically described later.

The toner image formed on the photosensitive drum 1 is, as described above, primary-transferred onto the rotating intermediary transfer belt 31 at the primary portion N1. During the primary transfer, to the primary transfer roller 15, a primary transfer voltage (primary transfer bias) which is a DC voltage of an opposite polarity (positive in this embodiment) to a normal charge polarity of the toner is applied by an unshown primary transfer voltage source. For example, during full-color image formation, the color toner images of yellow, magenta, cyan and black formed on the respective photosensitive drums 11 are successively primary-transferred superposedly onto the same image forming region of the intermediary transfer belt 31. In this embodiment, the primary transfer portion N1 is an image forming position where the toner image is formed on the intermediary transfer belt 31. The intermediary transfer belt 31 is an example of an endless belt rotatable while feeding the toner image carried in the image forming position.

On an outer peripheral surface side of the intermediary transfer belt 31, at a position opposing the inner secondary transfer roller 32, an outer secondary transfer roller (outer member) 41 is provided. The outer secondary transfer roller 41 functions as an opposing member (opposite electrode) to the inner secondary transfer roller 32. The outer secondary transfer roller 41 is pressed toward the inner secondary transfer roller 32 through the intermediary transfer belt 31 and forms the secondary transfer portion (secondary transfer nip) N2 which is a contact portion between the intermediary transfer belt 31 and the outer secondary transfer roller 41. The toner images formed on the intermediary transfer belt 31 as described above are secondary-transferred onto a recording material P sandwiched and fed by the intermediary transfer belt 31 and the outer secondary transfer roller 41 at the secondary transfer portion N2. In this embodiment, during the secondary transfer, to the outer secondary transfer roller 41, a secondary transfer voltage (secondary transfer bias) which is a DC voltage of the opposite polarity (positive in this embodiment) to the normal charge polarity of the toner is applied by a secondary transfer voltage source (not shown). In this embodiment, the outer secondary transfer roller 41 is electrically grounded (connected to the ground). Incidentally, the outer secondary transfer roller 41 is used as a secondary transfer member and a secondary transfer voltage of the opposite polarity to the normal charge polarity of the toner is applied thereto, and the inner secondary transfer roller 32 is used as an opposite electrode and may also be electrically grounded.

The recording materials P are stored (accommodated) in recording material cassettes 61*a* and 61*c* as recording material accommodating portions. The recording material P stored in each of the recording material cassettes 61*a* and 61*c* is fed to a feeding and conveying path 63 by rotationally driving an associated one of feeding rollers 62*a* to 62*c* which are feeding members as feeding means. This recording material P is fed to a registration roller pair 21 which is a feeding member as a feeding means by a conveying roller pair 64 or the like which is a conveying member as a conveying means, and is once stopped by the registration rollers pair 21. Then, this recording material P is sent into the secondary transfer portion N2 by rotational drive of the registration roller pair 21 while being timed to the toner image on the intermediary transfer belt 31.

With respect to the feeding direction of the recording material P, a feeding guide (pre-transfer guide) 22 for guiding the recording material P to the secondary transfer portion N2 is provided downstream of the registration roller pair 21 and upstream of the secondary transfer portion N2. The feeding guide 22 is constituted by including a first guiding member 22*a* contactable to a front surface of the recording material P (i.e., a surface onto which the toner image is to be transferred immediately after the recording material P passes through the feeding guide 22) and a second guiding member 22*b* contactable to a back surface of the recording material P (i.e., a surface opposite from the front surface). The first guiding member 22*a* and the second guiding member 22*b* are disposed opposed to each other, and the recording material P passes through between these members. The first guiding member 22*a* restricts movement of the recording material P in a direction toward the intermediary transfer belt 31. The second guiding member 11*b* restricts movement of the recording material P in a direction away from the intermediary transfer belt 31.

The recording material P on which the toner images are transferred is fed by a conveying belt (pre-fixing conveying device) 23 or the like toward a fixing device 50 as a fixing means. The fixing device 50 heats and presses the recording material P carrying thereon unfixed toner images by nipping and feeding the recording material P by a rotatable fixing member pair and thus fixes (melts) the toner images on the surface of the recording material P. Thereafter, the recording material P on which the toner images are fixed is discharged (outputted) to a discharge tray 92 provided on an outside of an apparatus main assembly 110 of the image forming apparatus 100 through a discharge recording path 91.

On the other hand, a deposited matter such as toner (primary transfer residual toner) remaining on the photosensitive drum 11 after the primary transfer is removed and collected from the surface of the photosensitive drum 11 by the drum cleaning device 16 as a cleaning means. Further, a deposited matter such as toner (secondary transfer residual toner) remaining on the intermediary transfer belt 6 after the secondary transfer is removed and collected from the surface of the intermediary transfer belt 31 by a belt cleaning device 37 as an intermediary member cleaning means.

Incidentally, in this embodiment, an intermediary transfer belt unit 30 as a belt feeding device is constituted by including the intermediary transfer belt 31, the respective stretching rollers 32 to 35, the respective primary transfer rollers 15, the belt cleaning device 37, a frame (not shown) supporting these members, and the like. In this embodiment, the intermediary transfer belt unit further includes the pressing member 70 and the moving mechanism 71 (FIG. 3) for changing a position of this pressing member 70. The intermediary transfer belt unit 30 is mountable to and dismountable (or pullable) from the apparatus main assembly 110 of the image forming apparatus 100 for maintenance and exchange.

Here, as the intermediary transfer belt 31, a belt constituted by a resin-based material formed in a single layer structure or a multi-layer structure including a resin layer constituted by a resin material and an elastic layer constituted by an elastic material can be used. Further, in this embodiment, the inner secondary transfer roller 32 is constituted by providing an elastic layer formed with an electroconductive rubber on an outer peripheral surface of a core metal (core material) made of metal. Further, in this embodiment, the pre-secondary transfer roller 35 is constituted by a metal roller. Further, in this embodiment, the outer secondary transfer roller 41 is constituted by providing an elastic layer formed of an ion-conductive foamed rubber on an outer peripheral surface of core metal (core material). Further, in this embodiment, a bearing member (not shown) shaft-supporting each of opposite ends of the outer secondary transfer roller 41 with respect to a rotational axis direction of the outer secondary transfer roller 41 is slidably movable in a direction toward the inner secondary transfer roller 32 and an opposite direction thereof. This bearing member is pressed toward the inner secondary transfer roller 32 by a pressing spring 42 (FIG. 2) constituted by a compression coil spring which is an urging member (elastic member) as an urging means. By this, the outer secondary transfer roller 41 contacts the inner secondary transfer roller 32 while sandwiching the intermediary transfer belt 31 therebetween with a predetermined pressure, and forms the secondary transfer portion N2. Incidentally, rotational axis directions of the stretching rollers including the inner secondary transfer roller 32 for stretching the intermediary transfer belt 31 and the outer secondary transfer roller 41 are substantially parallel to each other.

2. Secondary Transfer Portion

Parts (a) to (c) of FIG. 2 are schematic sectional views (cross sections substantially perpendicular to the rotational axis direction of the inner secondary transfer roller 32) for illustrating a shape (attitude) of the intermediary transfer belt 31 on a side upstream of the secondary transfer portion N2 in the image forming apparatus 100 of this embodiment. Part (a) of FIG. 2 shows a state before the recording material P moves to the secondary transfer portion N2, part (b) of FIG. 2 shows a state after the recording material P moves to the secondary transfer portion N2, and part (c) of FIG. 2 shows the secondary transfer portion N2 and a neighborhood thereof in part (b) of FIG. 2 in an enlarged manner.

As shown in FIG. 2, in this embodiment, as regards a shape of the intermediary transfer belt 31 formed by being stretched by the inner secondary transfer roller 32 and the pre-secondary transfer roller 35, the outer secondary transfer roller 41 is elastically urged toward the inner secondary transfer roller 32 by the urging spring 42. By this, the intermediary transfer belt 31 is nipped by the inner secondary transfer roller 32 and the outer secondary transfer roller 41, so that the secondary transfer portion N2 is formed.

Further, in this embodiment, the pressing member 70 is provided adjacent to the inner secondary transfer roller 32 in a position upstream of the secondary transfer portion N2. In this embodiment, during image formation (during the secondary transfer), a state in which the inner peripheral surface of the intermediary transfer belt 31 and a free end portion of the pressing member 70 are in contact with each other is formed. The pressing member 70 contacts the inner peripheral surface of the intermediary transfer belt 31 and is capable of pressing the intermediary transfer belt 31 from an inner peripheral surface side toward an outer peripheral surface side of the intermediary transfer belt 31. By this, the pressing member 70 is capable of protruding, from the inner peripheral surface side toward the outer peripheral surface side of the intermediary transfer belt 31, a stretching surface of the intermediary transfer belt 31 formed between the inner secondary transfer roller 32 and the pre-secondary transfer roller 35. In this embodiment, the pressing member 70 is formed of a flexible plate-like member made of a resin material and elastically deforms the intermediary transfer belt 31 by utilizing (flexure deformation) elasticity thereof. Accordingly, a shape (flexure amount, deformation amount) or position of the pressing member 70 is determined as a shape (or a position) such that an urging force by which the pressing member 70 urges the intermediary transfer belt 31 and reaction generated by tension of the intermediary transfer belt 31 are balanced with each other. In this embodiment, the thus determined shape (or position) of the pressing member 70 is also referred to as a "statically determinate shape" (or "statically determinate position"). Further, by this statically determinate shape (statically determinate position) of the pressing member 70, the shape (attitude) of the intermediary transfer belt 31 in the position upstream of the secondary transfer portion N2 is formed.

Further, in this embodiment, the image forming apparatus 100 has a constitution in which the position of the pressing member 70 can be changed by the action of the moving mechanism 71 (FIG. 3). By this, in this embodiment, the image forming apparatus 100 has a constitution in which the statically determined shape (statically determinate position), i.e., the shape (attitude) of the intermediary transfer belt 31 in the position upstream of the secondary transfer portion N2 can be controlled.

In this embodiment, to the inner secondary transfer roller 32, a bias of the same polarity as the charge polarity of the toner constituting the toner image on the intermediary transfer belt 31 is applied, and the outer secondary transfer roller 41 is connected to the ground. By this, a transfer electric field is formed in the step N2. To the secondary transfer portion N2 where the transfer electric field is formed, the recording material P is sent while being guided by the conveying guide 22 (FIG. 1). As shown in part (a) of FIG. 2, the recording material P contacts the intermediary transfer belt 31 at a free end thereof on a side upstream of the secondary transfer portion N2 and then is conveyed toward the secondary transfer portion N2 in a state in which the recording material P contacts the toner image formed on the surface of the intermediary transfer belt 31. Further, as shown in part (b) of FIG. 2, when the recording material P is conveyed to the secondary transfer portion N2, the toner image is transferred from the intermediary transfer belt 31 onto the recording material P by the pressing action between the inner secondary transfer roller 32 and the outer secondary transfer roller 41 and the electric action by the transfer electric field.

Here, for accurate secondary transfer, a length of contact between the intermediary transfer belt 31 and the recording material P with respect to the rotational direction of the intermediary transfer belt 31 on the side upstream of the secondary transfer portion N2 when the recording material P is conveyed to the secondary transfer portion N2 (herein, this length is also referred to as a "contact length") becomes important.

In the case where the contact length is long, there is a possibility that an image defect or the like due to friction between the recording material P and the toner image formed on the intermediary transfer belt 31 occurs. On the other hand, in the case where the contact length is short, a gap (spacing) G (part (c) of FIG. 2) between the intermediary transfer belt 31 and the recording material P becomes large, so that there is a possibility that the image defect or the like due to electric discharge generating in the gap G occurs.

Further, in the case where the recording material P high in rigidity such as thick paper or coated paper is used, the intermediary transfer belt 31 is liable to deform when the recording material P enters a contact position of the free end of the recording material P with the intermediary transfer belt 31 on the side upstream of the secondary transfer portion N2. By this, the above-described gap G is liable to generate, so that the image defect or the like due to the electric discharge in the gap G is liable to occur in some instances.

As in this embodiment, by providing the pressing member 70, the contact length between the intermediary transfer belt 31 and the recording material P on the side upstream of the secondary transfer portion N2 is easily set appropriately. Particularly, in this embodiment, the position of the pressing member 70 is variably controlled by the moving mechanism 71, so that the shape (attitude) of the intermediary transfer belt 31 in the position upstream of the secondary transfer portion N2 can be controlled. By this, the contact length between the intermediary transfer belt 31 and the recording material P in the position upstream of the secondary transfer portion N2 is optimized, so that the toner image can be secondary-transferred stably. Further, even in the case where the recording material P high in rigidity such as the thick paper or the coated paper is used, by an effect of elastic urging by the pressing member 70, deformation of the intermediary transfer belt 31 when the intermediary transfer belt 31 and the recording material P are in contact with each other can be suppressed. By this, it is possible to suppress that the gap G between the intermediary transfer belt 31 and the gap G becomes large.

Incidentally, the image forming apparatus 100 of this embodiment is an apparatus for realizing high productivity, and the intermediary transfer belt 31 is rotated in a speed of 400 [mm/sec]. Further, in the image forming apparatus 100 of this embodiment, the toner is negatively charged. Further, in the image forming apparatus 100 of this embodiment, in order to ensure an appropriate transfer performance even at a conveying speed of the intermediary transfer belt 31, a high-voltage bias of −10 [kV] is applied to the inner secondary transfer roller 32. However, the conveying speed of the intermediary transfer belt 31, the polarity of the toner, and a value of the secondary transfer voltage are not limited thereto.

3. Pressing Member and Moving Mechanism

Next, the pressing member 70 and the moving mechanism 71 for changing the position of this pressing member 70 will be described. FIG. 3 is a schematic perspective view showing the pressing member 70 and the moving mechanism 71 in this embodiment. Parts (a) and (b) of FIG. 4 are schematic side views of a portion in the neighborhood of the pressing member 70 for illustrating an operation of the moving mechanism 71 in this embodiment as viewed from a one end portion side (front side on the drawing sheet of FIG. 1) with respect to a rotational axis direction of the inner roller 32 in a direction substantially perpendicular to the rotational axis direction. Parts (a) and (b) of FIG. 4 show a state in which the intermediary transfer belt 31 is not provided for convenience of explanation.

<Pressing Member>

In this embodiment, the image forming apparatus 100 includes the pressing member (back-up member) 70 in the neighborhood of the position upstream of the secondary transfer portion N2 on the inner peripheral surface side of the intermediary transfer belt 31. The pressing member 70 is capable of causing the intermediary transfer belt 31 to project outward by pressing the inner peripheral surface of the intermediary transfer belt 31 in the neighborhood of the secondary transfer portion N2. With respect to the rotational direction of the intermediary transfer belt 31, the pressing member 70 is disposed upstream of the inner secondary transfer roller 32 and downstream of the pre-secondary transfer roller 35 so as to be contactable to the inner peripheral surface of the intermediary transfer belt 31. Particularly, in this embodiment, with respect to the feeding direction of the recording material P, the pressing member 70 is disposed so as to be contactable to the inner peripheral surface of the intermediary transfer belt 31 at a position opposing to a position of the feeding guide 221 (first guiding member 22*a*) provided upstream of the inner secondary transfer roller 32 and downstream of a free end of the feeding guide 22 on a downstream side.

In this embodiment, the pressing member 70 is constituted by a plate-like (sheet-like) member which has a substantially rectangular shape in a plan view and which has a predetermined length with respect to each of a longitudinal direction substantially parallel to a widthwise direction of the intermediary transfer belt 31 (substantially perpendicular to a surface movement direction of the intermediary transfer belt 31) and a short-side direction substantially perpendicular to the longitudinal direction and which has a predetermined thickness. Incidentally, the widthwise direction of the intermediary transfer belt 31 is a direction substantially perpendicular to the movement direction of the surface of the intermediary transfer belt 31, and is a direction substantially parallel to the rotational axis direction of the inner secondary transfer roller 32. The length of the pressing member 70 with respect to the longitudinal direction is equal to the length of the intermediary transfer belt 31 with respect to the widthwise direction. The pressing member 70 includes a free end portion 70*a*, which is one end portion (end portion on a downstream side with respect to the rotational direction of the intermediary transfer belt 31) with respect to the short direction thereof, contactable to the inner peripheral surface of the intermediary transfer belt 31 over a substantially full width of the intermediary transfer belt 31 and capable of pressing the intermediary transfer belt 31. Further, in this embodiment, a part of the pressing member 70 on a side where a fixing end portion (base end portion) 70*b* which is the other end portion (end portion on a side upstream with respect to the rotational direction of the intermediary transfer belt 31) with respect to the short direction is provided is fixed to a mounting portion 70*c* by bonding or the like. In this embodiment, the mounting portion 70*c* is constituted by a metal plate including a plate-like portion extending along the widthwise direction of the intermediary transfer belt 31 (along the longitudinal direction) of the pressing member 70), and is used for mounting the pressing member 70 on the moving mechanism 71 (described later).

The pressing member 70 is formed using a resin material in this embodiment. In this embodiment, the pressing member 70 is formed of PPS (polyphenylene sulfide) in a thickness of 0.5 mm, and the pressing member 70 elastically urges the intermediary transfer belt 31 by utilizing the flexure elasticity. Incidentally, the pressing member 70 is not limited to the constitution in this embodiment, but may only be required to elastically urge the intermediary transfer belt 31. For example, the thickness of the pressing member 70 is not limited to 0.5 mm, but may suitably be about 0.4-1.5 mm, and may also be 1.0 mm, for example. Further, a material of the pressing member 70 is not limited to the PPS, but may also be PEEK (polyether ether ketone), PET (polyethylene terephthalate), or the like.

Here, the pressing member 70, specifically the end portion on the free end portion 70*a* side with respect to the short(-side) direction of the pressing member 70 (herein, this portion is also simply referred to as a "free end") may desirably be disposed close to the inner secondary transfer roller 32 to the extent possible. However, the pressing member 70 is disposed so as not to contact the inner secondary transfer roller 32. For example, the pressing member 70 can be disposed so that the inner peripheral surface of the intermediary transfer belt 31 and the pressing member 70 are in contact with each other at a position, for example, about 2 mm or more, typically about 10 mm or more away from the position, where the inner secondary transfer roller 32 and the intermediary transfer belt 31 are in contact with each other, toward an upstream side of the rotational direction of the intermediary transfer belt 31. Further, for example, the pressing member 70 is disposed so that the inner peripheral surface and the intermediary transfer belt 31 and the leading end of the pressing member 70 are in contact with each other at a position, for example, about 40 mm or less, typically about 25 mm or less away from the position, where the inner secondary transfer roller 32 and the intermediary transfer belt 31 are in contact with each other, toward the upstream side of the rotational direction of the intermediary transfer belt 31.

<Moving Mechanism>

In this embodiment, the image forming apparatus 100 includes the moving mechanism 71 for changing the position of the pressing member 70. The moving mechanism 71 is capable of controlling the statically determined shape (statically determinate position) of the pressing member 70, i.e., the shape (attitude) of the intermediary transfer belt 31 in the position upstream of the secondary transfer portion N2 by changing the position of the pressing member 70. By this, the moving mechanism 71 is capable of optimizing the contact length between the intermediary transfer belt 31 and the recording material P on the side upstream of the secondary transfer portion N2. In other words, the moving mechanism 71 is capable of controlling a pressing amount (penetration amount described later) of the pressing member 70 to the intermediary transfer belt 31 by changing the position of the pressing member 70. Further, the moving mechanism may be capable of changing a state in which the pressing member 70 is moved toward or away from the intermediary transfer belt 31, by changing the position of the pressing member 70.

The moving mechanism 71 includes a supporting member 72 extending along the widthwise direction of the intermediary transfer belt 31. The pressing member 70 is fixed to the supporting member 72. In this embodiment, a part of the pressing member 70 on the fixing end portion 70*b* side with respect to the short direction is fixed to the mounting portion 70*c* over a substantially full width with respect to the longitudinal direction by bonding or the like, and this mounting portion 70*c* is fixed to the supporting member 72 by screws or the like. At opposite end portions of the supporting member 72 with respect to the longitudinal direction, supporting holes 72*a* constituted by cylindrical holes are provided. The supporting member 72 is supported by a frame (not shown) or the like of the intermediary transfer belt unit 30 so as to be rotatable about a rotational axis substantially parallel to the widthwise direction of the intermediary transfer belt 31 with the supporting holes 72*a* as a center. Thus, the supporting member 72 is rotated about the rotational axis substantially parallel to the widthwise direction of the intermediary transfer belt 31, so that the pressing member 70 is rotated around the rotational axis and thus the position of the pressing member 70 can be changed.

Further, the moving mechanism 71 includes a cam shaft 74 constituted by a cylindrical member extending along the widthwise direction of the intermediary transfer belt 31. The cam shaft 74 is supported by the frame (not shown) or the like of the intermediary transfer belt unit 30 so as to be rotatable about a rotational axis substantially parallel to the widthwise direction of the intermediary transfer belt 31. Further, the moving mechanism 71 includes a cam 73, a transmission gear 76, and a detection flag (cam position flag) 77. Each of the cam 73, the transmission gear 76, and the detection flag 77 is fixed to the cam shaft 74. The cam 73 is provided at each of opposite end portions of the cam shaft 74 with respect to a rotational axis direction of the cam shaft 74. Further, the moving mechanism 71 includes a cam driving motor 75 constituted by a stepping motor as a driving source. The cam driving motor 75 is fixed to the frame (not shown) or the like of the intermediary transfer belt unit 30 so that a driving gear 75*a* fixed to an output shaft thereof engages with the transmission gear 76 fixed to the cam shaft 74. When the cam driving motor 75 is rotated, drive is transmitted to the cam shaft 74 via the transmission gear 76, so that the cam 73, the transmission gear 76, and the detection of flag 77 are rotated integrally with the cam shaft 74 around the rotational axis substantially parallel to the widthwise direction of the intermediary transfer belt 31.

The cam 73 as an acting portion contacts a cam follower 72*b* provided on the supporting member 72 as a moving portion. The cam 73 forms a stepless (continuous) surface on which a radius from a rotation center thereof uniformly changes depending on an angle of rotation thereof. Accordingly, when the cam 73 is rotated by rotation of the cam driving motor 75, the supporting member 72 is rotated about the supporting holes 72*a*. By this, the moving mechanism 71 is capable of changing the position of the pressing member 70 by moving the pressing member 70. Here, in this embodiment, the change in position of the pressing member 70 specifically means a change in position of the free end of the pressing member 70 in the case where no intermediary transfer belt 31 is assumed (hereinafter, this position is referred to as a "free end position"). Specifically, in this embodiment, the change in position of the pressing member 70 means a change in position of the supporting member 72 as a movable (moving) portion included in the moving mechanism 71.

Further, the moving mechanism 71 includes a detecting sensor (cam position sensor, cam home position (HP) sensor) 78 as a detecting means (detecting portion) for detecting a position of the cam 73 with respect to the rotational direction of the cam 73, particularly a home position (HP) in this embodiment. By the detecting sensor 78 and the above-described detection flag 77 as an instruction means (instruction portion) fixed to the cam shaft 74, an optical position detecting mechanism is constituted. The moving mechanism 71 is capable of putting the attitude of the moving mechanism 71 in a neutral state set in advance, by the actions of the detection sensor 78 and the detection flag 77.

As shown in part (a) of FIG. 4, when the pressing member 70 is moved in a direction in which the pressing member 70 presses the intermediary transfer belt 31, the cam 73 is driven by the cam driving motor 75 and thus is rotated clockwise. By this, the supporting member 72 is rotated counterclockwise about the supporting holes 72*a*, so that the position (specifically, the free end position) of the pressing member 70 moves toward the outer peripheral surface side of the intermediary transfer belt 31. Further, as shown in part (b) of FIG. 4, when the pressing member 70 is moved in a direction opposite to the above-described direction, i.e., a direction in which the pressing member 70 is spaced from the intermediary transfer belt 31, the cam 73 is driven by the cam driving motor 75 and thus is rotated counterclockwise. By this, the supporting member 72 is rotated clockwise about the supporting holes 72*a*, so that the position (specifically, the free end position) of the pressing member 70 moves toward the inner peripheral surface side of the intermediary transfer belt 31.

Incidentally, in this embodiment, the supporting member 72 is urged so as to be rotated in a direction in which the cam follower engages with the cam 73. The supporting member 72 is not only urged by the tension of the intermediary transfer belt 31 through the pressing member 70 but also may be provided with springs or the like which are urging members as urging means for urging the supporting member 72. By this, the pressing member 70 can be spaced from the intermediary transfer belt 31.

FIG. 5 is a schematic sectional view (cross section substantially perpendicular to the rotational axis direction of the inner secondary transfer roller 32) for illustrating the penetration amount of the pressing member 70 into the intermediary transfer belt 31. The pressing amount of the pressing member 70 against the intermediary transfer belt 31 can be expressed by the penetration amount of the pressing member 70 into the intermediary transfer belt 31. The penetration amount of the pressing member 70 is roughly an amount in which the pressing member 70 is capable of protruding the intermediary transfer belt 31 toward the outside relative to the stretching surface of the intermediary transfer belt 31 formed by being stretched by the inner secondary transfer roller 32 and the pre-secondary transfer roller 35. The pre-secondary transfer roller 35 is an example of an upstream roller, of the plurality of stretching rollers, disposed adjacent to the inner secondary transfer roller 32 on the side upstream of the inner secondary transfer roller 32 with respect to the rotational direction of the intermediary transfer belt 31. That is, in the cross section of FIG. 5, a tangential line common to the inner secondary transfer roller 32 and the pre-secondary transfer roller 37 on a side in contact with the intermediary transfer belt 31 is a common tangential line 31*a*. At this time, a penetration amount D of the pressing member 70 can be defined as a normal (line) distance from the common tangential line 31*a* to the free end of the pressing member 70 (i.e., a distance between the common tangential line 31*a* and a line which passes though the free end of the pressing member 70 and which is parallel to the common tangential line). Incidentally, depending on a relative position between the inner secondary transfer roller 32 and the outer secondary transfer roller 41 with respect to the rotational direction of the intermediary transfer belt 31, the stretching surface of the intermediary transfer belt 31 on the side upstream of the secondary transfer portion N2 is formed in some cases by being stretched by the outer secondary transfer roller 41 and the pre-secondary transfer roller 35. In this case, relative to a tangential line common to the outer secondary transfer roller 41 and the pre-secondary transfer roller 37 on the side in contact with the intermediary transfer belt 31 can be defined as a penetration amount similarly as described above. Further, in this embodiment, the penetration amount D of the pressing member 70 for forming an appropriate shape (attitude) of the intermediary transfer belt 31 on the side upstream of the secondary transfer portion N2 is assumed as D1.

FIG. 6 is a schematic block diagram showing a control mode relating to setting (adjustment) of the position of the pressing member 70 in this embodiment. Further, FIG. 7 is a graph showing an outline of a relationship between the penetration amount D of the pressing member 70 and a pulse number (input pulse number) P inputted to the cam driving motor 75. In this embodiment, the image forming apparatus 100 includes a storing portion 79 and a controller 80. The controller 80 controls the position of the supporting member 72 with respect to the rotational direction of the supporting member 72 by controlling the angle of rotation of the cam 73, so that the controller 80 is capable of controlling the position of the pressing member 70 (specifically, the free end position). That is, the controller 80 can detect the neutral state of the moving mechanism 71 (home position of the cam 73) on the basis of a signal (information from the detecting sensor 78. Further, the controller 80 is capable of subjecting the cam driving motor 75 to pulse control. Further, the controller 80 inputs an arbitrary pulse number P to the cam driving motor 75 from the neutral state described above, and thus moves the supporting member 72 to an arbitrary position, so that the pressing member 70 can be moved to an arbitrary position. By this, the penetration amount D of the pressing member 70 can be variably controlled (FIG. 7). Particularly, in this embodiment, the controller 80 inputs the arbitrary pulse number P to the cam driving motor 75, and by the action of the moving mechanism 71, the controller 80 is capable of moving the pressing member 70 so that the penetration amount D of the pressing member 70 becomes (is close to) a predetermined penetration amount D1 set in advance.

Incidentally, although the penetration amount D is not limited thereto, the penetration amount D may preferably be about 1.0 mm to about 3.5 mm or less. By this, it is possible to not only stabilize the shape of the intermediary transfer belt 31 on the side upstream of the secondary transfer portion N2 but also reduce a possibility that smooth rotation of the intermediary transfer belt 31 is disturbed by an excessive increase in load on the contact surface between the pressing member 70 and the intermediary transfer belt 31. Further, the penetration amount D of the pressing member 70 may only be required to be a predetermined value when the recording material P passes through the neighborhood of an entrance of the secondary transfer portion N2 and the secondary transfer portion N2. The neighborhood of the entrance of the secondary transfer portion N2 is specifically a region corresponding to a region of the intermediary transfer belt 31 from a position, where the pressing member 70 contacts the intermediary transfer belt 31, to the secondary transfer portion N2 with respect to the feeding direction of the recording material P. Further, for example, in a stand-by state (state in which the image forming apparatus 100 waits for input of a job after turning-on of a power source), a power-off state, or a sleep state of the image forming apparatus 100, the pressing member 70 can be disposed in a position spaced from the intermediary transfer belt 31 (or in a simply contacted state to the intermediary transfer belt 31). By this, it is possible to suppress deformation or the like when the image forming apparatus 100 is left standing. In this embodiment, in the neutral state of the moving mechanism 71, the pressing member 70 is set in a state in which the pressing member 70 is spaced from the intermediary transfer belt 31. Further, in this embodiment, the moving mechanism 71 is in the neutral state when the image forming apparatus 100 is in the stand-by state, the power-off state, or the sleep state.

4. Control Mode

The apparatus main assembly 110 of the image forming apparatus 100 is provided with the controller 80, the storing portion 79, and further an input/output portion (not shown) of signals with respect to the controller 80 (FIG. 6).

The controller 80 is constituted by a CPU or the like which is a calculation control means for performing arithmetic processing. Further storing portion 79 is constituted by a ROM (including rewritable one), a RAM, and the like which are storing means (storing media). The controller 80 uses the RAM as a working area in accordance with a control program stored in the ROM, and is capable of integrally controlling the respective portions of the image forming apparatus 100 on the basis of input signals or the like from various sensors provided in the image forming apparatus 100. Further, the image forming apparatus 100 includes an operating portion (controlling panel) 120 (FIG. 1). The operating portion 120 includes a display portion (display means) for displaying information by being controlled by the controller 80 and an input portion (input means) for inputting information to the controller 80 by an operation by an operator such as a user or a service person. The operating portion 120 may be constituted by including a touch panel having functions of a display means and an input means. Further, to the image forming apparatus 100, an external device such as a personal computer, and an image reading device, or the like may be connected.

The controller controls the respective portions of the image forming apparatus 100 so as to execute the image forming operation on the basis of information of the job inputted from the external device or the operating portion 120. The information of the job includes a start instruction (start signal), information (instruction signal) on an image forming condition such as information on the recording material P, and image information (image signal) and the like. Incidentally, information on the recording material P (recording material information) includes arbitrary pieces of information capable of discriminating the recording material P inclusive of attributes (so-called paper kind categories) based on general features such as plain paper, high-quality paper, calendered paper, glossy paper, coated paper, embossed paper, thick paper, thin paper, and paper quality; numerical values and numerical ranges such as a basis weight, a thickness, and rigidity, or brands (including manufacturers, trade names, product numbers, and the like), and so on. Every recording material P discriminated by the information on the recording material P can be regarded as constituting the kind of the recording material P. Further, the information on the recording material P may be included in information on an operation in a print mode, such as a "plain paper mode" or a "thick paper mode", in which an operation setting of the image forming apparatus 100 is designated, or may also be replaced with information on the operation in the print mode.

The image forming apparatus 100 executes a job (printing job, print job) which is a series of operations which are started by a single start instruction and in which the image is formed and outputted on a single recording material P or in which the images are formed and outputted on a plurality of recording materials P. The job includes an image forming step (image forming operation), a pre-rotation step, a sheet (paper) interval step in the case where the images are formed on the plurality of recording materials P, and a post-rotation step in general. The image forming step is a period in which formation of an electrostatic image for the image actually formed and outputted on the recording material P, formation of the toner image, primary transfer of the toner image and secondary transfer of the toner image are carried out, and during image formation (image forming period) refers to this period. Specifically, timing during the image formation is different among positions where the respective steps of the formation of the electrostatic image, the toner image formation, the primary transfer of the toner image and the secondary transfer of the toner image are performed. The pre-rotation step is a period in which a preparatory operation, before the image forming step, from an input of the start instruction until the image is started to be actually formed is performed. The sheet interval step is a period corresponding to an interval between a recording material P and a subsequent recording material P when the images are continuously formed on a plurality of recording materials P (continuous image formation). The post-rotation step is a period in which a post-operation (preparatory operation) after the image forming step is performed. During non-image formation (non-image formation period) is a period other than the period of the image formation and includes the stand-by state, and the periods of the pre-rotation step, the sheet interval step, the post-rotation step and further includes a period of a pre-multi-rotation step which is a preparatory operation during turning-on of a main switch (power source) of the image forming apparatus 100 or during restoration from the sleep state, or a period from the stand-by state until the pre-rotation step or the pre-multi-rotation step is started. In this embodiment, as described later, the image forming apparatus 100 is capable of performing an operation for setting (adjusting) the position of the pressing member 70.

5. Setting (Adjustment) of Position of Pressing Member 70

FIG. 8 is a graph showing an outline of a relationship between a time in which the intermediary transfer belt 31 and the pressing member 70 are in contact with each other (herein, also referred to as a "contact time") T and the penetration amount D of the pressing member 70. Further, FIG. 9 is a schematic sectional view (cross section substantially perpendicular to the rotational axis direction of the inner secondary transfer roller 32) for illustrating a change in penetration amount D of the pressing member D.

As described above, the shape (attitude) of the intermediary transfer belt 31 on the side upstream of the secondary transfer portion N2 is determined by the statically determined shape (statically determinate position) of the pressing member 70 when the urging force of the pressing member 70 and the reaction force by the tension of the intermediary transfer belt 31 are balanced with each other. The pressing member 70 receives the reaction force by the tension of the intermediary transfer belt 31 and is deformed depending on the reaction force. That is, when the urging force of the pressing member 70 is fluctuated, the statically determinate shape (statically determinate position) of the pressing member 70 is fluctuated, so that the shape (attitude) of the intermediary transfer belt 31 on the side upstream of the secondary transfer portion N2 is also fluctuated.

When the inner peripheral surface of the intermediary transfer belt 31 and the pressing member 70 are in contact with each other, the pressing member 70 slides with the intermediary transfer belt 31 while receiving the reaction force by the tension of the intermediary transfer belt 31.

When the contact time T between the intermediary transfer belt 31 and the pressing member 70 becomes long, depending on the contact time T, a change with time such as creep deformation (herein, simply referred to as "deformation") or abrasion of the pressing member 70 progresses. Thus, when the change with time such as the deformation or the abrasion occurs on the pressing member 70, as shown in FIGS. 8 and 9, the penetration amount D of the pressing member 70 changes from the appropriate penetration amount D1 to, for example, a penetration amount D2 (<D1). Incidentally, a chain-double-dashed line in FIG. 9 represents a state of the pressing member 70 in which the change with time such as the deformation or the abrasion occurs. In this case, an elastic deformation amount of the pressing member 70 lowers, and the reaction force by the tension of the intermediary transfer belt 31 lowers, i.e., a deformation amount of the intermediary transfer belt 31 becomes small. That is, when the change with time such as the deformation or the abrasion occurs, the intermediary transfer belt 31 is moved away from the recording material P, so that the contact length between the recording material P and the intermediary transfer belt 31 becomes short. By this, there is a possibility that an image defect due to electric discharge occurs in the secondary transfer portion N2.

Here, in the case where a hard material such as metal is used as a material of the pressing member 70, it would be considered that the abrasion of the pressing member 70 can be suppressed. However, in this case, the inner peripheral surface of the intermediary transfer belt 31 is abraded, so that an uneven shape is liable to be formed. Thus, when unevenness is formed on the inner peripheral surface of the intermediary transfer belt 31, there is a possibility that a stable current is not applied in the secondary transfer portion N2 and thus the image defect occurs. Further, a high-voltage current is applied to the secondary transfer portion N2, and therefore, in the case where the pressing member 70 is formed of metal, the current is liable to leak to the pressing member 70, so that there is a possibility that a proper current does not flow through the secondary transfer portion N2 and thus the image defect occurs. When the pressing member 70 is spaced to a position where leakage of a transfer current does not occur, a surface of the intermediary transfer belt 31 between the pressing member 70 and the inner secondary transfer roller 32 or the outer secondary transfer roller 41 is liable to be deformed, so that there is a possibility that an effect by providing the pressing member 70 becomes insufficient. For that reason, the pressing member 70 may preferably be formed of a flexible resin material. However, as described later, the material of the pressing member 70 is not limited to the resin material.

In order to maintain the intermediary transfer belt 31 on the side upstream of the secondary transfer portion N2 in an appropriate shape (attitude), there is a need to maintain the penetration amount D (urging force) of the pressing member 70 in an appropriate state. Therefore, in this embodiment, the controller 80 operates the moving mechanism 71 on the basis of information on contact history (contact state, contact status) between the intermediary transfer belt 31 and the pressing member 70 (herein, this information is also referred to as "contact history information"). By this, on the basis of the contact history information between the intermediary transfer belt 31 and the pressing member 70, the controller 80 controls the moving mechanism 71 so as to move the pressing member 70 to an appropriate position so that the penetration amount D of the pressing member 70 becomes (is close to) the appropriate penetration amount D1. In this embodiment, in the storing portion 79, the contact history information between the intermediary transfer belt 31 and the pressing member 70 is stored. In this embodiment, in the storing portion 79, as the contact history information between the intermediary transfer belt 31 and the pressing member 70, the contact time T between the intermediary transfer belt 31 and the pressing member 70 is stored. That is, in this embodiment, the contact time T between the intermediary transfer belt 31 and the pressing member 70 is stored. That is, in this embodiment, the controller 80 measures a time of contact when the pressing member 70 is contacted to the intermediary transfer belt 31, and sequentially updates and stores the measured time in the storing portion 79. Further, in the storing portion 79, information indicating a relationship between the contact time T and the above-described pulse number P inputted to the cam driving motor 75 for changing the penetration amount D of the pressing member 70 to the appropriate penetration amount D1 (i.e., information for correcting an initial pulse number P depending on the contact time T) is stored. In this embodiment, the information for correcting the initial pulse number P depending on the contact time T is specifically information on values A and B described later. Further, when an operation in which the pressing member 70 presses the intermediary transfer belt 31 is performed, depending on the contact time T stored in the storing portion 79, the controller 80 controls an operation of the moving mechanism 71 so that the penetration amount D of the pressing member 70 becomes the appropriate penetration amount D1. That is, the controller 80 carries out control so that the appropriate pulse number P is inputted to the cam driving motor 75 depending on the contact time T.

FIG. 10 is a flowchart of an example of an operation of a job including the operation for setting (adjusting) the position of the pressing member 70 in this embodiment. A series of operations of the moving mechanism 71 during the image formation will be described using the flowchart of FIG. 10. Incidentally, for simplifying description, the case where the image is formed on a single recording material P is taken as an example. Further, the image forming operation is executed in a state in which the intermediary transfer belt 31 is pressed by the pressing member 70 (penetration amount D>0).

When the information of the job is inputted from the external device such as the personal computer (S101), the controller 80 carries out control so that the moving mechanism 71 is put in the neutral state, on the basis of the signal from the detecting sensor 78 (S102). In S102, when the moving mechanism 71 has already been in the neutral state, the controller 80 maintains the neutral state, and in the case where the moving mechanism 71 is not in the neutral state, the controller 80 causes the cam driving motor 75 to drive so that the moving mechanism 71 is put in the neutral state. Incidentally, as described above, in this embodiment, in the neutral state of the moving mechanism 71, the pressing member 70 is spaced from the intermediary transfer belt 31.

Next, the controller 80 discriminates a magnitude relationship between the contact time T and the predetermined time (threshold) T1 set in advance by making reference to the contact time T, between the intermediary transfer belt 31 and the pressing member 70, stored in the storing portion 79 (S103). In the case where the controller 80 discriminated in S103 that the contact time T is shorter than the time T1 ("No"), the controller 80 discriminates that the pulse number P inputted to the cam driving motor 75 is P1 (S104). Incidentally, the pulse number P is an arbitrary pulse number P set so that the penetration amount D of the pressing member 70 becomes the appropriate penetration amount D1 in a state (initial state) in which the change with time such as the deformation or the abrasion does not occur on the pressing member 70.

Further, in the case where the controller 80 discriminated in S103 that the contact time T is longer than the time T1 ("Yes"), the controller 80 discriminates a magnitude relationship between the contact time T and a predetermined time (threshold) T2 (>T1) set in advance (S105). In the case where the controller 80 discriminates in S105 that the contact time T is shorter than the time T2 ("No"), the controller 80 discriminates that the pulse number P inputted to the cam driving motor 75 is P2 (S106). This pulse number P2 is obtained by adding an additional pulse number A to the above-described pulse number P1 (initial pulse number P) and is an arbitrary value. For example, when the contact time T is T2, in the case where the deform and abrasion amount of the pressing member 70 is assumed as 0.5 mm, the penetration amount D of the pressing member 70 lowers by 0.5 mm. In this case, in order to maintain the penetration amount D in an appropriate state, there is a need to increase the penetration amount D by 0.5 mm. Thus, the pulse number for increasing the penetration amount D by 0.5 mm is the "pulse number A". Further, in the case where the controller 80 discriminated in S105 that the contact time T is longer than the time T2 ("Yes"), the controller 80 discriminates that the pulse number P inputted to the cam driving motor 75 is P3 (S107). This pulse number P3 is obtained by adding an additional pulse number B (>A) to the above-described pulse number P (initial pulse number P) and is an arbitrary value. Then, the controller discriminates the pulse number P, inputted to the cam driving motor 75, in S104, S106 or S107, and thereafter, the pulse number P is inputted to the cam driving motor 75, and an operation of moving the pressing member 70 by the moving mechanism 71 is executed (S108).

After the operation of moving the pressing member 70 by the moving mechanism 71 is completed, the controller 80 executes the image forming operation (S109). Then, after the image forming operation is ended, as soon as a predetermined post-rotation operation is ended, the moving mechanism 71 is moved to the neutral state (S110).

Then, the controller 80 updates a value of the contact time T by adding a contact time between the intermediary transfer belt 31 and the pressing member 70 newly generated in a current image forming operation to the contact time T stored in the storing portion 79 (S111), and then the image forming apparatus 100 is put in the stand-by state.

As described above using part (a) of FIG. 4, when the cam driving motor 75 is operated and the cam 73 is rotated, the supporting member 72 contacting the cam 73 is rotated around the supporting holes 72*a* in the counterclockwise direction, so that the pressing member 70 is moved so as to increase the penetration amount D. FIG. 11 is a schematic sectional view for illustrating a state in which the position of the pressing member 70 causes the change with time such as the deformation or the abrasion. Further, FIG. 12 is a graph showing an outline of a relationship between the contact time T, the penetration amount D, and the pulse number P inputted to the cam driving motor 75 in this embodiment. In this embodiment, the contact time T becomes longer than the time T1 or the time T2, so that even when the change with time such as the deformation or the abrasion occurs, the position of the pressing member 70 is controlled by the above-described series of operations. By this, in this embodiment, even when a repetitive use amount of the image forming apparatus 100 is increased, the appropriate penetration amount D1 (specifically, the penetration amount falling within a predetermined range with respect to the predetermined penetration amount D1) of the pressing member 70 can be maintained (FIGS. 11 and 12). Incidentally, a broken line in FIG. 11 represents a state of the moving mechanism 71 and the pressing member 70 when the change with time such as the deformation or the abrasion occurs and the pulse numbers P2 and P3 are inputted to the cam driving motor 75. Further, as shown in FIG. 12, when the contact time T becomes long, the pulse number P inputted to the cam driving motor 75 is changed so as to become large.

Further, when periodical maintenance of the image forming apparatus 100 is performed or unintended deformation occurs on the pressing member 70, the pressing member 70 can be exchanged with a new pressing member. At that time, the operator such as the service person is capable of inputting an instruction from the operating portion 120 of the image forming apparatus 100 to the controller 80 so as to initialize (reset) the value of the contact time T stored in the storing portion 79 to an initial value (for example, 0 (zero)). A similar operation may be made from an external device communicatably connected to the image forming apparatus 100. By this, even when the pressing member 70 is exchanged with the new pressing member, the penetration amount D can be maintained by setting the pulse number P inputted to the cam driving motor 75, at an appropriate timing. Incidentally, this is also true for the case where a unit including the pressing member 70, such as a unit in which the pressing member 70 and at least a part of the moving mechanism 71 are integrally made exchangeable, or the intermediary belt unit 30 is exchanged.

Further, in the case where the contact time T exceeds the threshold during execution of a continuous image forming job for a plurality of recording materials P, the position of the pressing member 70 may be changed in the sheet interval step.

6. Modified Embodiments

Incidentally, in this embodiment, description was made that when the image forming operation is executed, the intermediary transfer belt 31 and the pressing member are always in contact with each other, but the present invention is not limited thereto. For example, a constitution in which the intermediary transfer belt 31 and the pressing member 70 are in contact with each other when the toner image is transferred onto the high-rigidity recording material P such as the thick paper or the coated paper and in which the pressing member 70 is retracted from the intermediary transfer belt 31 when the toner image is transferred onto other recording materials P may be employed. That is, the image forming apparatus 100 may also have a constitution in which during image formation (secondary transfer) in at least one operation in a predetermined mode, a state of contact between the pressing member 70 and the intermediary transfer belt 31 is formed. As during this image formation in the at least one operation in the predetermined mode, it is possible to cite during image formation in an operation in a mode in which the high-rigidity recording material P such as the thick paper or the coated paper is used. In this case, typically during the image formation in the at least one operation in the predetermined mode, a state in which the intermediary transfer belt 31 is pressed by the pressing member 70 (penetration amount D>0) is formed. Further, in this case, during the image formation in an operation in a mode other than the above-described predetermined mode in which the plain paper or the like is used as the recording material P, the pressing member 70 is retracted so as not to contact the intermediary transfer belt 31.

Further, the image forming apparatus 100 may be capable of executing operations in a plurality of modes in which the pressing member 70 and the intermediary transfer belt 31 are in contact with each other. At this time, in part or all of the modes, the predetermined penetration amount D of the pressing member 70 may be different. In this case, in each of the operations in the modes, control similar to the control in this embodiment may only be required to be performed so that the appropriate penetration amount D can be obtained depending on the contact time T.

Further, the moving mechanism 71 is not limited to the above-described constitution in this embodiment, but an arbitrary constitution in which the position of the pressing member 70 (specifically, the free end position) can be arbitrarily moved may be employed. In this embodiment, the moving mechanism 71 has a constitution in which the moving mechanism 71 rotates the pressing member 70, but may only be required to have a constitution in which a moving portion capable of moving the pressing member 70 in a direction in which the pressing member 70 presses the intermediary transfer belt 31 and an opposite direction thereto. For example, the moving mechanism 71 may also have a constitution in which the position of the pressing member 70 (specifically, the free end position) can be changed by linearly reciprocating (slidably moving) the pressing member 70. Further, the moving mechanism 71 is not limited to a moving mechanism using an actuator for actuating a movable portion by the cam, but may also be a moving mechanism using an actuator or the like for actuating the movable portion with use of, for example, a solenoid.

Further, in this embodiment, description was made that the pressing member 70 is constituted by the flexible planar sheet material, but the present invention is not limited thereto. The pressing member 70 may also have, for example, a constitution in which a contact member contacting the intermediary transfer belt 31 on the side upstream of the secondary transfer portion N2 and an elastic member such as a spring are provided and elastically urge the intermediary transfer belt 31. For example, a constitution in which the intermediary transfer belt 31 is elastically urged by urging the contact member, formed of a metal plate relatively high in rigidity, by the elastic member (urging member) constituted by a compression coil spring, a tension spring, or the like may be employed. In this case, the moving mechanism 71 can be constituted so as to move the pressing member (for example, the elastic member) constituted by including the contact member and the elastic member. As a contact member, for example, a roller formed of an elastic material such as a sponge or a rubber, a roller formed of a rigid material such as resin or metal, or the like roller may be used. However, the pressing member 70 is easily disposed so as to be sufficiently close to the secondary transfer portion N2, so that the pressing member 70 may preferably be constituted by a planar sheet material. Further, although the pressing member 70 can be constituted by a thin metal plate or the like, from the viewpoint of suppressing the abrasion of the intermediary transfer belt 31 and leakage of the transfer current as described above or the like viewpoint, the pressing member 70 may preferably be constituted by a resin material.

Further, in this embodiment, the information for correcting, depending on the contact time T, the pulse number P1 for changing the penetration amount D to the appropriate penetration amount D1 in the initial state (new article state) of the pressing member 70 was acquired in advance and was stored in the storing portion 79. However, the present invention is not limited to such a constitution. For example, information (table data or the like) indicating a relationship between the pulse number P and the penetration amount D as shown in FIG. 7 (i.e., a relationship between an angle of rotation of the cam 73 and an angle of rotation of the supporting member 72) may be set in advance at plurality of levels for each of the contact times. By this, depending on the current contact time T, the position of the pressing member 70 can be changed so as to provide an arbitrary penetration amount D.

Further, in this embodiment, description was made that the contact time T was used as the contact history information between the intermediary transfer belt 31 and the pressing member 70, but the present invention is not limited to such a constitution.

As the contact history information between the intermediary transfer belt 31 and the pressing member 70, contact history information can be used if the information permits rough estimation of the contact time between the intermediary transfer belt 31 and the pressing member 70. For example, the contact history information may be the number of sheets subjected to the image formation (the number of sheets outputted in the image forming operation), a rotation time or the number of rotations of the intermediary transfer belt 31, and the like. In a constitution in which a state in which the pressing member 70 substantially always contacts the intermediary transfer belt 31 during the image formation is formed, the number of sheets subjected to the image formation, the rotation time or the number of rotations of the intermediary transfer belt 31 can preferably be used. Further, the contact history information may be stored by being divided for each of kinds of the recording materials P. For example, from the viewpoint of the rigidity, an acceleration coefficient set in advance depending on the kind of the recording material P may be added to the contact history information. Further, in the case where the image forming operation is executable in setting of a plurality of different penetration amounts D, the contact history information may be stored in a division manner for each setting of the penetration amount D. For example, an acceleration coefficient set in advance depending on the setting of the penetration amount D may be added to the contact history information. Further, a detection result of an environment sensor as an environment detecting means for detecting an environment of the image forming apparatus 100 (at least one of a temperature and a humidity of at least one of an inside and an outside of the image forming apparatus 100) may be used in combination. For example, environment conditions of the temperature and the humidity when the intermediary transfer belt 31 and the pressing member 70 are in contact with each other are stored in combination, and for example, the acceleration coefficient set in advance depending on the temperature and the humidity may be added to the contact history information.

Further, in this embodiment, each of the contact time T and the pulse number P inputted to the cam driving motor 75 is set at three levels, but the present invention is not limited to such a constitution. A constitution in which the position of the pressing member is changed using, as a trigger, preliminarily defined contact history information exceeding a predetermined threshold may only be required to be employed. For example, in this embodiment, although the position of the pressing member 70 (the pulse number P inputted to the cam driving motor 75) was changed stepwise with respect to a change in contact history information, the present invention is not limited to such a constitution. For example, control may be carried out so that the penetration amount D of the pressing member 70 is made substantially constant by changing the position of the pressing member 70 (the pulse number P inputted to the cam driving motor 75) with respect to the change in contact history information substantially continuously (linearly).

Further, for example, in a constitution in which the pressing member 70 substantially always contacts the intermediary transfer belt 31, a constitution in which the moving mechanism 71 is capable of moving the pressing member 70 only in a direction in which the pressing member 70 presses the intermediary transfer belt 31 may be employed. Also, by such a constitution, in the case where the pressing member 70 caused the change with time such as the deformation or the abrasion, the position of the pressing member 70 can be changed so that the penetration amount D of the pressing member 70 is changed to the predetermined penetration amount D1.

Further, in this embodiment, the apparatus main assembly 110 of the image forming apparatus 100 is provided with the storing portion 79 and the controller 80, but the present invention is not limited thereto. If setting (adjustment) of the position of the pressing member 70 similar to the setting (adjustment) in this embodiment can be carried out, the storing portion 79 and the controller 80 may be provided at any portions of the image forming apparatus 100. For example, the intermediary transfer belt unit 30 may be provided with at least one of the storing portion 79 and the controller 80.

7. Effects

As described above, in this embodiment, the image forming apparatus 100 includes the rotatable endless belt 31 carrying the toner image, the plurality of stretching rollers which stretch the belt 31 and which includes the inner roller 32 and the upstream roller 35 disposed adjacent to the inner roller 32 on the side upstream of the inner roller 32 with respect to the rotational direction of the belt 31, the outer member 41 disposed opposed to the inner roller 32 and forming the transfer portion N2 where the toner image is transferred from the belt 31 onto the recording material P in contact with the outer peripheral surface of the belt 31, the pressing member 70 contactable to the inner peripheral surface of the belt 31 in the position upstream of the inner roller and downstream of the upstream roller with respect to the rotational direction of the belt 31 and capable of pressing the belt 31 from the inner peripheral surface side toward the outer peripheral surface side while elastically urging the belt 31, and the moving mechanism 71 provided with the moving portion 72 movable so as to move the pressing member 70 in the direction in which the pressing member 70 presses the belt 31, wherein in the state in which the belt 31 is pressed by the pressing member 70, the operation in the mode in which the toner image is transferred from the belt 31 onto the recording material P is capable of being executed. Further, in this embodiment, the image forming apparatus 100 includes the storing portion 79 for storing the contact history information correlating with the time of the contact between the belt 31 and the pressing member 70, and includes the controller 80 which sets, on the basis of the contact history information, the position of the moving portion 72 when the above-described operation in the mode is executed.

In this embodiment, the controller 80 sets the position of the moving portion 72 during the execution of the operation in the mode so that the amount of movement of the pressing member 70 by the moving portion 72 in the direction in which the pressing member 70 presses the belt 31 becomes larger in the case where the contact time between the belt 31 and the pressing member 70 indicated by the contact history information is a first time than in the case where the contact time is a second time longer than the first time. Further, in this embodiment, on the basis of the contact history information, the controller sets the position of the moving portion 72 during the execution of the operation in the mode so that the penetration amount of the belt 31 by the pressing member 70 during the execution of the operation in the mode becomes the predetermined penetration amount. Further, in this embodiment, the moving portion 71 is rotatable around the rotational axis substantially parallel to the widthwise direction of the belt 31, and the controller 80 sets the position of the moving portion 72 with respect to the rotational direction of the moving portion 72 when the above-described operation in the mode is executed. Further, in this embodiment, the moving mechanism 71 includes the motor 75 for rotating the moving portion 72, and the controller 80 controls the position of the moving portion 72 with respect to the rotational direction by controlling a driving amount of the motor 75.

Further, in this embodiment, the pressing member 70 is constituted by the plate-like member such that the longitudinal direction thereof is disposed substantially parallel to the widthwise direction of the belt 31, that the end portion thereof with respect to the short(-side) direction on the upstream side of the rotational direction of the belt 31 is connected to the moving portion 72, and that the end portion thereof with respect to the short direction on the downstream side of the rotational direction of the belt 31 is contactable to the inner peripheral surface of the belt 31. Further, in this embodiment, the pressing member 70 is formed of the resin material at least at a contact portion with the belt 31. Incidentally, the contact history information may be information on the contact time between the belt 31 and the pressing member 70. Further, the contact history information may be information on the rotational time or the number of rotations of the belt 31. Further, the contact history information may be information on the number of sheets of the recording materials on which the images are formed and outputted.

Further, according to this embodiment, even in the case where the pressing member 70 caused to change with time such as the deformation or the abrasion, the shape (attitude) of the intermediary transfer belt 31 on the side upstream of the secondary transfer portion N2 can be maintained in the appropriate shape (attitude). For that reason, it is possible to suppress the change in contact length between the intermediary transfer belt 31 and the recording material P. By this, the occurrence of the image defect can be suppressed.

Other Embodiments

The present invention was described above based on specific embodiments, but is not limited thereto.

In the above-described embodiments, as the outer member for forming the secondary transfer portion in cooperation with the inner roller as the inner member, the outer roller directly contacting the outer peripheral surface of the intermediary transfer belt was used. On the other hand, a constitution in which as the outer member, the outer roller and a secondary transfer belt stretched by the outer roller and other rollers are used may also be employed. Further, for example, the secondary transfer roller is contacted to the outer peripheral surface of the intermediary transfer belt by the outer roller. In such a constitution, by the inner roller contacting the inner peripheral surface of the intermediary transfer belt and the outer roller contacting the inner peripheral surface of the secondary transfer belt, the intermediary transfer belt and the secondary transfer belt are sandwiched, so that the secondary transfer portion is formed. In this case, a contact portion between the intermediary transfer belt and the secondary transfer belt is the secondary transfer portion (secondary transfer nip).

Further, in the above-described embodiments, the case where the belt-shaped image bearing member was the intermediary transfer belt was described, but the present invention is applicable when an image bearing member constituted by an endless belt for feeding the toner image borne at the image forming position is used. Examples of such a belt-shaped image bearing member may include a photosensitive (member) belt and an electrostatic recording dielectric (member) belt, in addition to the intermediary transfer belt in the above-described embodiments.

Further, the present invention can be carried out also in other embodiments in which a part or all of the constitutions of the above-described embodiments are replaced with alternative constitutions thereof. Accordingly, when the image forming apparatus using the belt-shaped image bearing member is used, the present invention can be carried out with no distinction as to tandem type/single drum type, a charging type, an electrostatic image forming type, a developing type, a transfer type and a fixing type. In the above-described embodiments, a principal part relating to the toner image formation/transfer was described principally, but the present invention can be carried out in various uses, such as printers, various printing machines, copying machines, facsimile machines and multi-function machines, by adding necessary device, equipment and a casing structure.

According to the present invention, even in the case where the pressing member caused the change with time such as the deformation or the abrasion, it is possible to suppress the occurrence of the image defect by maintaining the shape of the belt to a proper shape on the side upstream of the transfer portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-021680 filed on Feb. 15, 2022, which is hereby incorporated by reference herein in its entirety.

What is claimed is:

1. An image forming apparatus comprising:

an intermediary transfer belt onto which a toner image is transferred;

a plurality of stretching rollers configured to stretch the belt, wherein the stretching rollers include an inner roller forming a transfer portion where the toner image is transferred from the belt onto a recording material and an upstream roller provided upstream of and adjacent to the inner roller with respect to a rotational direction of the belt;

a pressing member contactable to an inner peripheral surface of the belt in at position upstream of the inner roller and downstream of the upstream roller with respect to the rotational direction of the belt and capable of pressing the belt from an inner peripheral surface side toward an outer peripheral surface side by elastically urging the belt;

a supporting member provided movably and configured to support the pressing member;

a moving mechanism configured to move the supporting member; and a controller capable of executing an operation in a mode in which the toner image is transferred from the belt onto the recording material in a state in which the pressing member presses the belt, and configured to control the moving mechanism, wherein in a case that the operation in the mode is executed for recording materials of a predetermined kind in a predetermined environmental condition, when a sum of times each in which the operation in the mode was executed from a new state of the pressing member is a first time, a position of the supporting member during execution of the operation in the mode is a first position, and when the sum is a second time longer than the first time, the position of the supporting member during the execution of the operation in the mode is a second position where the pressing member is moved in a direction in which the pressing member presses the belt more than in the first position.

2. An image forming apparatus according to claim 1, wherein on the basis of information correlating with a time in which the pressing member presses the belt, the controller controls the position of the supporting member during the execution of the operation in the mode so that a pressing amount of the belt by the pressing member during the execution of the operation in the mode is a predetermined pressing amount.

3. An image forming apparatus according to claim 1, wherein the supporting member is rotatable about a rotational axis substantially parallel to a widthwise direction of the belt, and the controller controls the position of the supporting member with respect to a rotational direction of the supporting member during the execution of the operation in the mode.

4. An image forming apparatus according to claim 1, wherein the moving mechanism includes a motor for rotating the supporting member, and the controller controls the position of the supporting member with respect to a rotational direction of the supporting member by controlling a driving amount of the motor.

5. An image forming apparatus according to claim 1, wherein the pressing member is disposed so that a longitudinal direction thereof is substantially parallel to a widthwise direction of the belt, and is formed of a plate-like member of which end portion with respect to a short direction on an upstream side of the rotational direction of the belt is connected to the supporting member and which end portion with respect to the short direction on a downstream side of the rotational direction of the belt is contactable to the inner peripheral surface of the belt.

6. An image forming apparatus according to claim 1, wherein the pressing member is formed of a resin material at least at a portion thereof contacting the belt.

7. An image forming apparatus according to claim 2, wherein the information is information on a rotation time of the belt or a number of rotations of the belt.

8. An image forming apparatus according to claim 2, wherein the information is information on a number of sheets of recording materials on which images are formed and which are outputted.

9. An image forming apparatus according to claim 1, wherein the first time is a time in which a number of sheets subjected to image formation and outputted in the operation in the mode is a first number of sheets, and the second time is a time in which the number of the sheets is a second number of sheets greater than the first number of sheets.

10. An image forming apparatus comprising:

an intermediary transfer belt onto which a toner image is transferred;

a plurality of stretching rollers configured to stretch the belt, wherein the stretching rollers include an inner roller forming a transfer portion where the toner image is transferred from the belt onto a recording material and an upstream roller provided upstream of and adjacent to the inner roller with respect to a rotational direction of the belt;

a pressing member contactable to an inner peripheral surface of the belt at a position upstream of the inner roller and downstream of the upstream roller with respect to the rotational direction of the belt and capable of pressing the belt from an inner peripheral surface side toward an outer peripheral surface side by elastically urging the belt;

a supporting member provided movably and configured to support the pressing member;

a moving mechanism configured to move the supporting member; and a controller capable of executing an operation in a mode in which the toner image is transferred from the belt onto the recording material in a state in which the pressing member presses the belt, and configured to control the moving mechanism, wherein in a case that the operation in the mode is executed for recording materials of a predetermined kind in a predetermined environmental condition, when a sum of numbers of sheets each outputted in the operation in the mode executed from a new state of the pressing member is a first number of sheets, a position of the supporting member during execution of the operation in the mode is a first position, and when the sum is a second number of sheets greater than the first number of sheets, the position of the supporting member during the execution of the operation in the mode is a second position where the pressing member is moved in a direction in which the pressing member presses the belt more than in the first position.

11. An image forming apparatus comprising:

an intermediary transfer belt onto which a toner image is transferred;

a plurality of stretching rollers configured to stretch the belt, wherein the stretching rollers include an inner roller forming a transfer portion where the toner image is transferred from the belt onto a recording material and an upstream roller provided upstream of and adjacent to the inner roller with respect to a rotational direction of the belt;

a pressing member contactable to an inner peripheral surface of the belt at a position upstream of the inner roller and downstream of the upstream roller with respect to the rotational direction of the belt and capable of pressing the belt from an inner peripheral surface side toward an outer peripheral surface side by elastically urging the belt;

a supporting member provided movably and configured to support the pressing member;

a moving mechanism configured to move the supporting member; and a controller capable of executing an operation in a mode in which the toner image is transferred from the belt onto the recording material in a state in which the pressing member presses the belt, and configured to control a position of the supporting member during execution of the operation in the mode, wherein the controller controls the position of the supporting member during the execution of the operation in the mode on the basis of information correlating with a time in which the pressing member presses the belt.

12. An image forming apparatus according to claim 11, wherein the information is a number of sheets of recording materials outputted in the operation in the mode.

13. An image forming apparatus according to claim 11, wherein the controller controls the moving mechanism so that:

when a sum of times each in which the pressing member presses the belt from a new state of the pressing member is a first time, a position of the supporting member during execution of the operation in the mode is a first position, and when the sum is a second time longer than the first time, the position of the supporting member during the execution of the operation in the mode is a second position where the pressing member is moved in a direction in which the pressing member presses the belt more than in the first position.

* * * * *